(12) United States Patent
Yanagisawa et al.

(10) Patent No.: US 12,736,867 B2
(45) Date of Patent: Sep. 15, 2026

(54) PROJECTION SYSTEM AND PROJECTOR WITH INTERMEDIATE IMAGE FORMED BETWEEN FIRST AND SECOND OPTICAL SYSTEMS

(71) Applicant: SEIKO EPSON CORPORATION, Tokyo (JP)

(72) Inventors: Hirotaka Yanagisawa, Azumino (JP); Nobutaka Minefuji, Omachi (JP); Hitoshi Hirano, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 499 days.

(21) Appl. No.: 18/155,971

(22) Filed: Jan. 18, 2023

(65) Prior Publication Data

US 2023/0367191 A1 Nov. 16, 2023

(30) Foreign Application Priority Data

Jan. 19, 2022 (JP) ................................ 2022-006174

(51) Int. Cl.
*G03B 21/28* (2006.01)
*G02B 13/16* (2006.01)

(52) U.S. Cl.
CPC ............. *G03B 21/28* (2013.01); *G02B 13/16* (2013.01)

(58) Field of Classification Search
CPC ........ G03B 21/28; G03B 21/14; G02B 17/08; G02B 13/22; G02B 13/18; G02B 13/16
See application file for complete search history.

(56) References Cited

U.S. PATENT DOCUMENTS 8,014,075 B2 * 9/2011 Minefuji ................ G02B 17/08 359/649
9,946,144 B2 4/2018 Abe et al.
(Continued)

FOREIGN PATENT DOCUMENTS

CN 110873949 A 3/2020
JP 2008-165187 A 7/2008
(Continued)

*Primary Examiner* — Bao-Luan Q Le
(74) *Attorney, Agent, or Firm* — Oliff PLC

(57) ABSTRACT

A projection system includes a first optical system and a second optical system sequentially arranged from a reduction side toward an enlargement side. The second optical system includes an optical element having a concave reflection surface and a first lens having negative power, the optical element and the first lens sequentially arranged from the reduction side toward the enlargement side. The projection system satisfies Conditional Expressions (1) and (2) below, $$3.5 \leq *(LL+Mr)/imy \times TR \times (1/NA) \leq 6.0 \quad (1)$$

$$TR \leq 0.2 \quad (2)$$

where LL represents the largest radius of the first lens, MR represents the largest radius of the reflection surface, imy represents a first distance from an optical axis to the largest image height at an image formation device, M represents a projection magnification that is the quotient of division of a second distance from the optical axis to the largest image height of an enlarged image by the first distance imy, TR represents a throw ratio that is the quotient of division of a projection distance by the second distance, and NA represents the numerical aperture of the image formation device.

9 Claims, 26 Drawing Sheets

(56) References Cited

U.S. PATENT DOCUMENTS

| | | | | |
|---|---|---|---|---|
| 10,025,092 | B1* | 7/2018 | Lin | G02B 13/16 |
| 11,106,122 | B2* | 8/2021 | Wang | G02B 13/007 |
| 2009/0116124 | A1* | 5/2009 | Minefuji | G02B 17/08 359/733 |
| 2015/0346469 | A1* | 12/2015 | Lin | G02B 13/16 353/121 |
| 2016/0116830 | A1* | 4/2016 | Lin | G02B 21/28 353/97 |
| 2019/0056648 | A1* | 2/2019 | Amano | G02B 27/0955 |
| 2019/0331999 | A1* | 10/2019 | Lee | G03B 21/28 |
| 2020/0278600 | A1* | 9/2020 | Yanagisawa | G02B 17/08 |
| 2021/0173292 | A1* | 6/2021 | Yanagisawa | G03B 21/006 |
| 2022/0113518 | A1* | 4/2022 | Miya | G02B 9/04 |

FOREIGN PATENT DOCUMENTS

| | | | | |
|---|---|---|---|---|
| JP | 2020-34690 | A | | 3/2020 |
| JP | 2021004970 | A | * | 1/2021 |

* cited by examiner 620.0000 NM
550.0000 NM
470.0000 NM
LONGITUDINAL SPHERICAL ABER.
1.00
0.75
0.50
0.25
-0.0500
-0.0250
0.0
0.0250
0.0500
FOCUS (MILLIMETERS)
ASTIGMATIC FIELD CURVES
IMG HT
11.80
8.85
5.90
2.95
S
T
-0.200
-0.100
0.0
0.100
0.200
FOCUS (MILLIMETERS)
DISTORTION
IMG HT
11.80
8.85
5.90
2.95
-5.0
-2.5
0.0
2.5
5.0
% DISTORTION 3C
31
32
33
34
34a
36
37
41,43
42
V1
V2
30
L17
L24
L15
L16
L14
L13
L12
L11
L10
51
L9
L8
L7
L23
L6
L5
L22
L4
L3
L2
L21
L1
19
18
N
X
Y
Y1
Y2
Z
Z1
Z2

3D
31
32
33
34
34a
44
V1
V2
30
L1
L2
L3
L4
L5
L6
L7
L8
L9
L10
L11
L12
L13
L14
L15
L16
L17
L21
L22
L23
L24
51
18
19
N
X
Y
Z
Y1
Y2
Z1
Z2

PROJECTION SYSTEM AND PROJECTOR WITH INTERMEDIATE IMAGE FORMED BETWEEN FIRST AND SECOND OPTICAL SYSTEMS

The present application is based on, and claims priority from JP Application Serial Number 2022-006174, filed Jan. 19, 2022, the disclosure of which is hereby incorporated by reference herein in its entirety.

BACKGROUND

1. Technical Field

The present disclosure relates to a projection system and a projector.

2. Related Art

JP-A-2020-34690 describes a projector in which a projection system enlarges a projection image displayed at an image display device and projects the enlarged projection image onto a screen. The projection system includes a first refractive optical system, a reflective optical system, and a second refractive optical system sequentially arranged from the reduction side toward the enlargement side. The first refractive optical system includes a plurality of refractive lenses. The reflective optical system includes a concave mirror and reflects beams from the first refractive optical system toward the side facing the image display device in directions that intersect with the optical axis of the first refractive optical system. The second refractive optical system is formed of a single refractive lens. The refractive lens is an enlargement-side lens located at a position closest to the enlargement side in the projection system. Beams from the concave mirror enter the enlargement-side lens in directions that intersect with the optical axis of the enlargement-side lens.

Out of the examples of the projection system disclosed in JP-A-2020-34690, the projection system having the shortest projection distance has a projection distance of 257.6 mm. The enlargement-side lens of the thus configured projection system has an effective radius of 79.7 mm. The thus configured projection system further has a throw ratio of 0.154.

A projector including a projection system having a smaller throw ratio has a shorter projection distance over which the projector projects an enlarged image having a predetermined size. A projection system incorporated in a projector used indoors or at similar locations therefore needs to have a short focal length that provides a throw ratio smaller than or equal to 0.2.

A projection system having a shorter focal length tends to produce larger amounts of aberrations at the enlargement side. It is therefore necessary to increase the effective radius of the enlargement-side lens, through which the beams from the concave mirror obliquely pass, to allow the enlargement-side lens to correct the beams on an image height basis. When the size of the enlargement-side lens is increased to provide a sufficient effective radius, however, the amount of protrusion by which the enlargement-side lens protrudes radially from the first optical axis of the first refractive optical system increases, resulting in an increase in the diameter of the entire projection system. The size of the projector that incorporates the projection system is therefore not reduced.

SUMMARY

To solve the problem described above, a projection system according to an aspect of the present disclosure is a projection system for enlarging a projection image formed by an image formation device disposed in a reduction-side conjugate plane and projecting the enlarged image in an enlargement-side conjugate plane. The projection system including a first optical system and a second optical system sequentially arranged from the reduction side toward the enlargement side. The first optical system includes a diaphragm. The second optical system includes an optical element and a first lens sequentially arranged from the reduction side toward the enlargement side, the optical element having a concave reflection surface, the first lens having negative power. An intermediate image conjugate with the reduction-side conjugate plane and the enlargement-side conjugate plane is formed between the first optical system and the second optical system. A portion at the reduction side of the first optical system forms a telecentric portion. The projection system satisfies Conditional Expressions (1) and (2) below, $$3.5 \leq *(LL+Mr)/imy \times TR \times (1/NA) \leq 6.0 \tag{1}$$

$$TR \leq 0.2 \tag{2}$$

where LL represents a largest radius of the first lens, MR represents a largest radius of the reflection surface, imy represents a first distance from an optical axis to a largest image height at the image formation device, Tr represents a throw ratio that is a quotient of division of a projection distance by a second distance from the optical axis to a largest image height of the enlarged image, and NA represents a numerical aperture of the image formation device.

A projection system according to another aspect of the present disclosure is a projection system for enlarging a projection image formed by an image formation device disposed in a reduction-side conjugate plane and projecting the enlarged image in an enlargement-side conjugate plane. The projection system includes a first optical system and a second optical system sequentially arranged from the reduction side toward the enlargement side. The second optical system includes an optical element having a concave reflection surface and a first lens having negative power, the optical element and the first lens sequentially arranged from the reduction side toward the enlargement side. An intermediate image conjugate with the reduction-side conjugate plane and the enlargement-side conjugate plane is formed between the first optical system and the second optical system. A first region and a second region overlap with each other, the first region being a region as a result of projection of a luminous flux passage region of a reduction-side lens surface of the first lens onto an optical axis, the second region being a region as a result of projection of a luminous flux passage region of the reflection surface onto the optical axis.

A projector according to another aspect of the present disclosure includes the projection system described above and the image formation device that forms a projection image in the reduction-side conjugate plane of the projection system.

DESCRIPTION OF EXEMPLARY EMBODIMENTS

An optical system and a projector according to an embodiment of the present disclosure will be described below with reference to the drawings.

Projector

Figure 1:
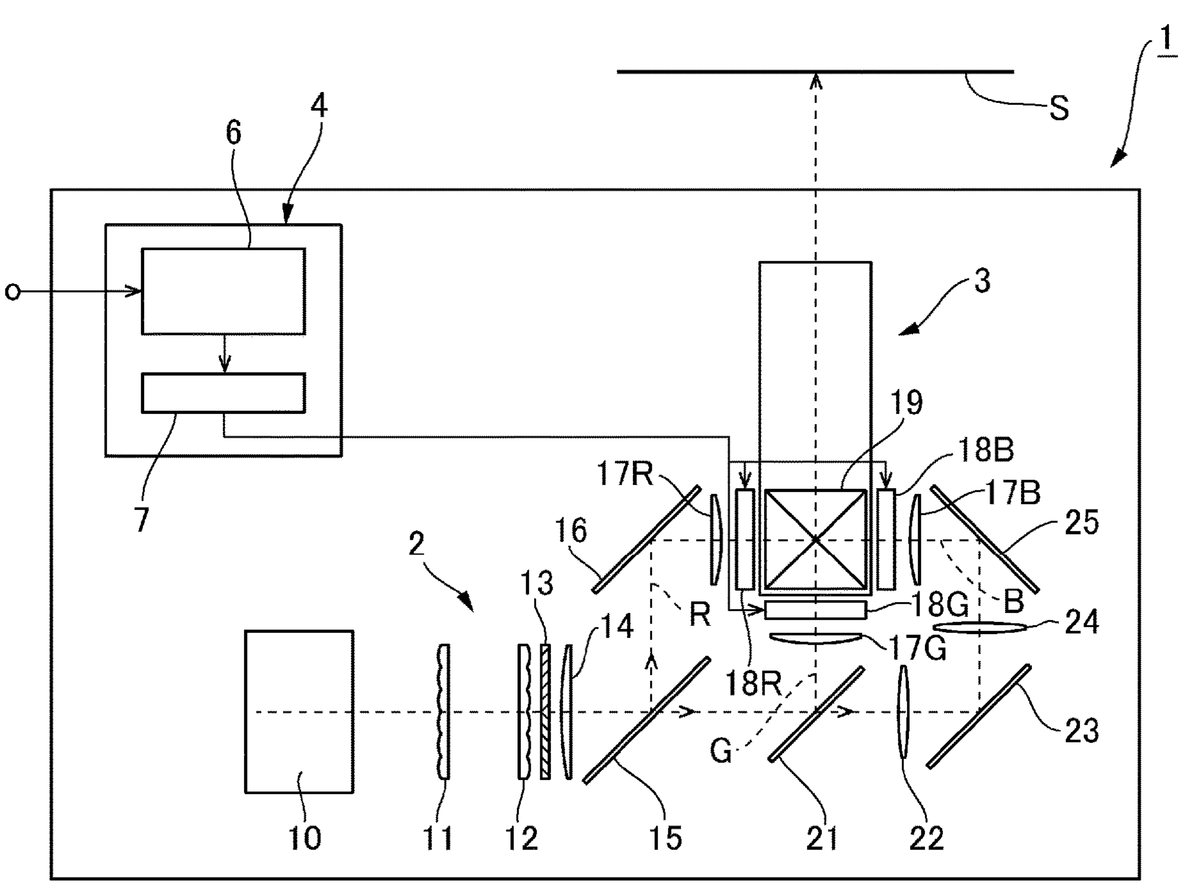
FIG. 1 shows a schematic configuration of a projector including a projection system according to an embodiment of the present disclosure.

FIG. 1 shows a schematic configuration of a projector including a projection system 3 according to the embodiment of the present disclosure. A projector 1 includes an image formation unit 2, which generates a projection image to be projected onto a screen S, the projection system 3, which enlarges the projection image and projects the enlarged projection image onto the screen S, and a controller 4, which controls the operation of the image formation unit 2, as shown in FIG. 1.

Image Formation Unit and Controller

The image formation unit 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides a luminous flux from the light source 10 into a plurality of luminous fluxes. The lens elements of the first optical integration lens 11 focus the luminous flux from the light source 10 in the vicinity of the lens elements of the second optical integration lens 12.

The polarization converter 13 converts the light from the second optical integration lens 1 into predetermined linearly polarized light. The superimposing lens 14 superimposes images of the lens elements of the first optical integration lens 11 on one another in a display region of each of liquid crystal panels 18R, 18G, and 18B, which will be described later, via the second optical integration lens 12.

The image formation unit 2 further includes a first dichroic mirror 15, a reflection mirror 16, a field lens 17R, and the liquid crystal panel 18R. The first dichroic mirror 15 reflects R light, which is part of the beams incident via the superimposing lens 14, and transmits G light and B light, which are part of the beams incident via the superimposing lens 14. The R light reflected off the first dichroic mirror 15 travels via the reflection mirror 16 and the field lens 17R and is incident on the liquid crystal panel 18R. The liquid crystal panel 18R is an image formation element. The liquid crystal panel 18R modulates the R light in accordance with an image signal to form a red projection image.

The image formation unit 2 further includes a second dichroic mirror 21, a field lens 17G, and the liquid crystal panel 18G. The second dichroic mirror 21 reflects the G light, which is part of the beams via the first dichroic mirror 15, and transmits the B light, which is part of the beams via the first dichroic mirror 15. The G light reflected off the second dichroic mirror 21 passes through the field lens 17G and is incident on the liquid crystal panel 18G. The liquid crystal panel 18G is an image formation element. The liquid crystal panel 18G modulates the G light in accordance with an image signal to form a green projection image.

The image formation unit 2 further includes a relay lens 22, a reflection mirror 23, a relay lens 24, a reflection mirror 25, a field lens 17B, the liquid crystal panel 18B, and a cross dichroic prism 19. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is an image formation element. The liquid crystal panel 18B modulates the B light in accordance with an image signal to form a blue projection image.

The liquid crystal panels 18R, 18G, and 18B surround the cross dichroic prism 19 in such a way that the liquid crystal panels 18R, 18G, and 18B face three sides of the cross dichroic prism 19. The cross dichroic prism 19 is a prism for light combination and generates a projection image that is the combination of the light modulated by the liquid crystal panel 18R, the light modulated by the liquid crystal panel 18G, and the light modulated by the liquid crystal panel 18B.

The projection system 3 enlarges the combined projection image from the cross dichroic prism 19 and projects the enlarged projection image onto the screen S.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors of the corresponding color. The display driver 7 operates the liquid crystal panels 18R, 18G, and 18B based on the color projection image signals outputted from the image processor 6. The image processor 6 thus displays projection images corresponding to the image signals on the liquid crystal panels 18R, 18G, and 18B.

Projection System

The projection system 3 will next be described. The screen S is disposed in the enlargement-side conjugate plane of the projection system 3, as shown in FIG. 1. The liquid crystal panels 18R, 18G, and 18B are disposed in the reduction-side conjugate plane of the projection system 3.

Examples 1 to 5 will be described below as examples of the configuration of the projection system 3 incorporated in the projector 1.

Example 1

Figure 2:
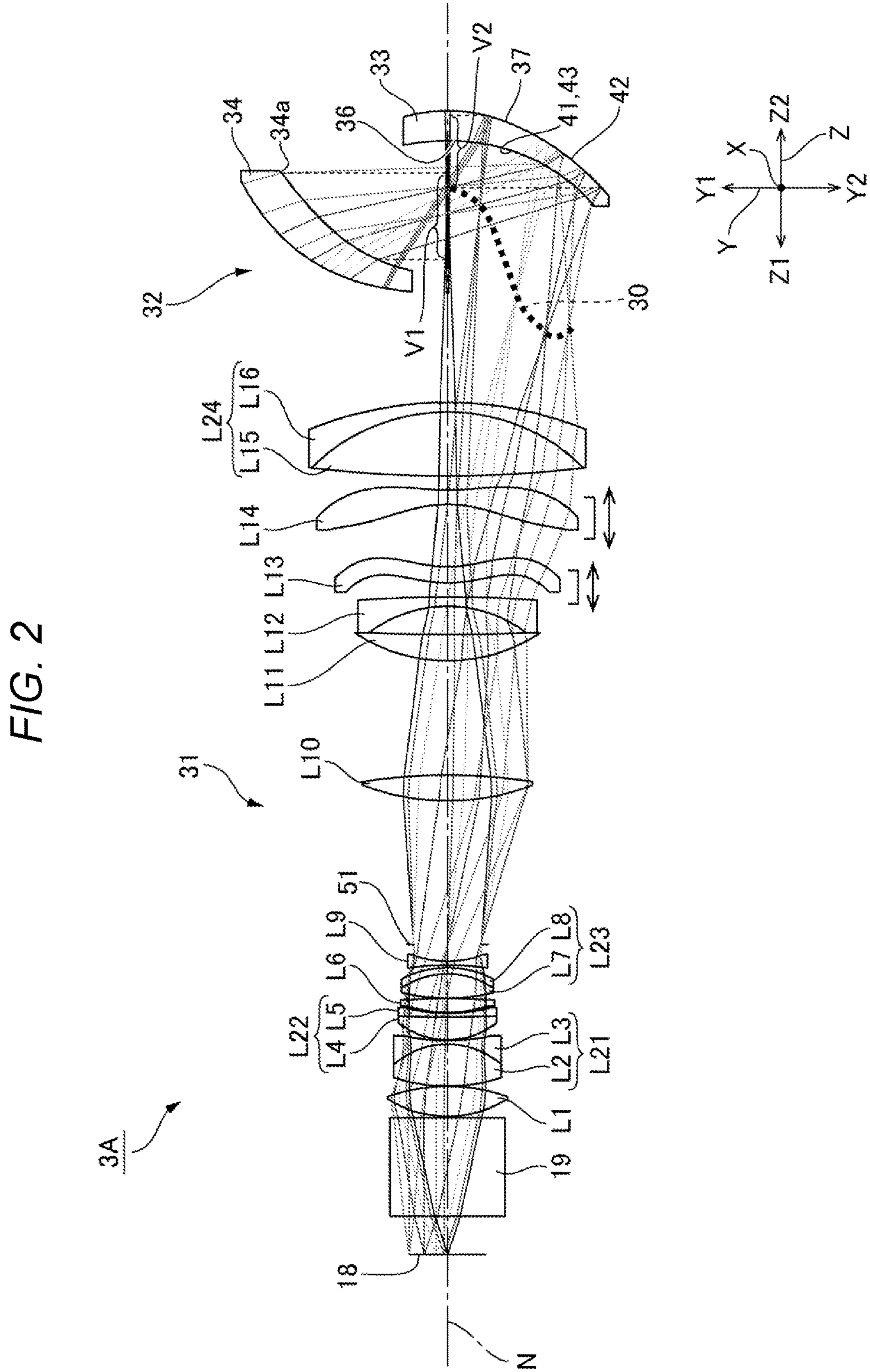
FIG. 2 is a beam diagram showing beams passing through the projection system according to Example 1.

FIG. 2 is a beam diagram showing beams passing through a projection system 3A according to Example 1. In the beam diagrams for the projection systems 3 according to Examples 1 to 5, the liquid crystal panels 18R, 18G, and 18B are referred to as a liquid crystal panel 18. The projection system 3A according to the present example is formed of a first optical system 31 and a second optical system 32 sequentially arranged from the reduction side toward the enlargement side, as shown in FIG. 2. The second optical system 32 is disposed on an optical axis N of the first optical system 31.

In the following description, three axes perpendicular to one another are called axes X, Y, and Z for convenience. The axis Z coincides with the optical axis N of the first optical system 31. The direction along the optical axis N is an axis-Z direction. The axis-Z direction toward the side where the first optical system 31 is located is called a first direction Z1, and the axis-Z direction toward the side where the second optical system 32 is located is called a second direction Z2. The axis Y extends along the screen S. The upward-downward direction is an axis-Y direction, with one side of the axis-Y direction called an upper side Y1 and the other side of the axis-Y direction called a lower side Y2. The axis X extends in the width direction of the screen.

The first optical system 31 is a refractive optical system. The first optical system 31 is formed of sixteen lenses L1 to L16. The lenses L1 to L16 are arranged in the presented order from the reduction side toward the enlargement side. A diaphragm 51 is disposed between the lens L9 and the lens L10.

The lens L6 has aspherical shapes at opposite sides. The lens L13 has aspherical shapes at opposite sides. The lens L14 has aspherical shapes at opposite sides. The lens L2 and the lens L3 are bonded to each other into a cemented doublet L21. The lens L4 and the lens L5 are bonded to each other into a cemented doublet L22. The lens L7 and the lens L8 are bonded to each other into a cemented doublet L23. The lens L15 and the lens L16 are bonded to each other into a cemented doublet L24.

The second optical system 32 includes an optical element 33 and a first lens 34. The optical element 33 and the first lens 34 are arranged in the presented order from the reduction side toward the enlargement side. The optical element 33 has a first surface 36, which faces the reduction side, and a second surface 37, which faces the side opposite from the first surface 36. The optical element 33 has a reflective coating layer at the second surface 37. The first surface 36 has a concave shape. The second surface 37 has a convex shape. The optical element 33 has a first transmission surface 41, a reflection surface 42, and a second transmission surface 43 sequentially arranged from the reduction side toward the enlargement side. The first transmission surface 41 is provided at the first surface 36. The first transmission surface 41 has a concave shape. The reflection surface 42 is the reflective coating layer and has a concave shape to which the surface shape of the second surface 37 has been transferred. The reflection surface 42 reflects light within the optical element 33. The second transmission surface 43 is provided at the first surface 36. The second transmission surface 43 has a concave shape. The first transmission surface 41, the reflection surface 42, and the second transmission surface 43 are each an aspherical shape. The first transmission surface 41, the reflection surface 42, and the second transmission surface 43 are located at the lower side Y2 of the optical axis N, as shown in FIG. 2.

The first lens 34 is disposed between the lens L16 and the optical element 33 in the direction of the optical axis N and at the upper side Y1 of the optical axis N. The first lens 34 has negative power. The first lens 34 has a convex enlargement-side surface and a concave reduction-side surface. The first lens 34 has aspherical shapes at opposite sides.

A first region V1 and a second region V2 overlap with each other, as shown in FIG. 2. The first region V1 is a region as a result of projection of a luminous flux passage region of a reduction-side lens surface 34*a* (reduction-side lens surface) of the first lens 34 onto the optical axis N, and the second region V2 is a region as a result of projection of a luminous flux passage region of the reflection surface 42 onto the optical axis N.

The liquid crystal panel 18 of the image formation unit 2 is disposed in the reduction-side conjugate plane of the projection system 3A. The screen S is disposed in the enlargement-side conjugate plane of the projection system 3A.

The liquid crystal panel 18 forms a projection image in an image formation plane perpendicular to the optical axis N of the first optical system 31. The liquid crystal panel 18 is disposed in a position offset from the optical axis N of the first optical system 31 toward the upper side Y1. The projection image is therefore formed in a position offset from the optical axis N toward the upper side Y1.

The beams from the liquid crystal panel 18 pass through the first optical system 31 and the second optical system 32 in the presented order. Between the first optical system 31 and the second optical system 32, the beams pass through the lower side Y2 of the optical axis N. The beams are thus incident on the first transmission surface 41 of the optical element 33, which forms the second optical system 32.

The beams having entered the optical element 33 via the first transmission surface 41 travels toward the reflection surface 42. The beams having reached the reflection surface 42 are deflected back in the first direction Z1 towards the upper side Y1. The beams deflected back by the reflection surface 42 travel toward the second transmission surface 43. The beams having exited via the second transmission surface 43 cross the optical axis N toward the upper side Y1 and travels toward the first lens 34. The beams passing through the first lens 34 are widened by the first lens 34 and reach the screen S.

An intermediate image 30 is formed between the lens L16 and the reflection surface 42.

In the projection system 3A, the portion at the reduction side of the first optical system 31 is a telecentric portion. The term "telecentric" means that the central beam of each luminous flux traveling between the first optical system 31 and the liquid crystal panel 18 disposed in the reduction-side conjugate plane is parallel or substantially parallel to the optical axis of the projection system.

The projection system 3A has a changeable projection distance. When the projection distance is changed, the lenses L13 and L14 of the first optical system 31 are moved along the optical axis N for focusing.

Data on the projection system 3A are listed below,

LL 64.3 mm
MR 49.7 mm
imy 11.8 mm
scy 1473 mm
M 125
PD 168 mm
TR 0.114
NA 0.313
OL 11% where LL represents the largest radius of the first lens 34, MR represents the largest radius of the reflection surface 42, imy represents a first distance from the optical axis N to the largest image height at the liquid crystal panel 18, scy represents a second distance from the optical axis N to the largest image height of the enlarged image projected on the screen S, M represents a projection magnification that is the quotient of division of the second distance by the first distance, PD represents a projection distance that is the distance from the first lens 34 to the screen S, TR represents a throw ratio that is the quotient of division of the projection distance by the second distance, NA represents the numerical aperture of the liquid crystal panel 18, and OL represents an overlap ratio that is the quotient of division of the first region by the second region.

Data on the lenses of the projection system 3A are listed below. The surfaces of the lenses are numbered sequentially from the reduction side toward the enlargement side. Reference characters are given to the liquid crystal panel, the dichroic prism, the lenses, the optical element, the first lens, and the screen. Data labeled with a surface number that does not correspond to any of the liquid crystal panel, the dichroic prism, the lenses, the optical element, the first lens, and the screen is dummy data. Reference character R represents the radius of curvature. Reference character D represents the axial inter-surface spacing. Reference character C represents the aperture radius, and twice the aperture radius is the diameter of the lens surface. Reference characters R, D, and C are each expressed in millimeters.

| Reference character | Surface number | Shape | R | D | Glass material | Refraction/Reflection | C |
|---|---|---|---|---|---|---|---|
| 18 | 0 | Spherical | Infinity | 12.0000 | | Refraction | 0.0000 |
| 19 | 1 | Spherical | Infinity | 31.0600 | SBSL7_OHARA | Refraction | 13.5918 |
| | 2 | Spherical | Infinity | 0.5000 | | Refraction | 16.6277 |
| L1 | 3 | Spherical | 35.2847 | 9.2979 | SFPL51_OHARA | Refraction | 17.3864 |
| | 4 | Spherical | −55.4170 | 0.1000 | | Refraction | 17.2045 |
| L2 | 5 | Spherical | 53.1915 | 13.2016 | SFPL51_OHARA | Refraction | 15.5000 |
| L3 | 6 | Spherical | −24.9552 | 1.2000 | SLAH55V_OHARA | Refraction | 13.9685 |
| | 7 | Spherical | 63.2923 | 0.2000 | | Refraction | 13.6541 |
| L4 | 8 | Spherical | 24.3360 | 7.1767 | SFPL51_OHARA | Refraction | 14.0882 |
| L5 | 9 | Spherical | 380.3225 | 1.2000 | SLAH55V_OHARA | Refraction | 13.7489 |
| | 10 | Spherical | 51.5712 | 0.2000 | | Refraction | 13.4723 |
| L6 | 11 | Aspherical | 32.0905 | 4.5000 | LBAL35_OHARA | Refraction | 13.4940 |
| | 12 | Aspherical | −134.9471 | 0.1000 | | Refraction | 13.3938 |
| L7 | 13 | Spherical | 61.5686 | 7.5914 | 519175.5419 | Refraction | 13.2085 |
| L8 | 14 | Spherical | 25.0000 | 2.0000 | SLAH55VS_OHARA | Refraction | 12.8549 |
| | 15 | Spherical | −29.8695 | 0.8280 | | Refraction | 12.8460 |
| L9 | 16 | Spherical | −80.8658 | 1.2000 | SLAH55V_OHARA | Refraction | 11.3301 |
| | 17 | Spherical | 30.8042 | 5.2958 | | Refraction | 10.6239 |
| 51 | 18 | Spherical | Infinity | 44.9733 | | Refraction | 10.5177 |
| | 19 | Spherical | Infinity | 0.2000 | | Refraction | 23.6260 |
| L10 | 20 | Spherical | 73.9012 | 8.0640 | EFD1_HOYA | Refraction | 24.9872 |
| | 21 | Spherical | 170.3392 | 0.2000 | | Refraction | 25.0000 |
| | 22 | Spherical | Infinity | 35.6635 | | Refraction | 24.9832 |
| L11 | 23 | Spherical | 51.5474 | 8.2539 | STIM2_OHARA | Refraction | 38.0000 |
| | 24 | Spherical | 524.8620 | 8.9325 | | Refraction | 24.1124 |
| L12 | 25 | Spherical | −39.9922 | 3.0000 | TAFD55W_HOYA | Refraction | 23.9922 |
| | 26 | Spherical | −349.9088 | Variable spacing 1 | | Refraction | 26.3032 |
| L13 | 27 | Aspherical | 38.8539 | 5.0842 | E48R_ZEON | Refraction | 31.5921 |
| | 28 | Aspherical | 36.1680 | Variable spacing 2 | | Refraction | 34.5080 |

-continued

| Reference character | Surface number | Shape | R | D | Glass material | Refraction/ Reflection | C |
|---|---|---|---|---|---|---|---|
| L14 | 29 | Aspherical | −35.7720 | 4.5000 | E48R_ZEON | Refraction | 36.7745 |
| | 30 | Aspherical | 61.7301 | Variable spacing 3 | | Refraction | 38.7915 |
| L15 | 31 | Spherical | 353.5468 | 20.0000 | SBSM14_OHARA | Refraction | 39.6720 |
| L16 | 32 | Spherical | −60.0000 | 3.0000 | EFDS1W_HOYA | Refraction | 39.6812 |
| | 33 | Spherical | −13.2468 | 82.4341 | | Refraction | 41.1611 |
| 41 | 34 | Aspherical | −65.3767 | 9.5000 | E48R_ZEON | Refraction | 45.0955 |
| 42 | 35 | Aspherical | 44.9827 | −9.5000 | E48R_ZEON | Reflection | 48.1799 |
| 43 | 36 | Aspherical | −65.3767 | −41.9443 | | Refraction | 42.9615 |
| 34 | 37 | Aspherical | 54.1015 | −6.0000 | E48R_ZEON | Refraction | 52.2393 |
| | 38 | Aspherical | 142.2509 | 0.0000 | | Refraction | 64.3335 |
| | 39 | Spherical | Infinity | Variable spacing 4 | | Refraction | 313.8463 |
| S | 40 | Spherical | Infinity | 0.0000 | | Refraction | 2324.7663 |

The projection system 3A according to the present example has a changeable projection distance selected from a standard distance, a short distance shorter than the standard distance, and a long distance longer than the standard distance. When the projection distance is changed, the lenses L13 and L14 are each moved in the direction of the optical axis N for focusing.

The table below shows the variable spacings 1, 2, 3, and 4 at the projection distances where the focusing is performed. The variable spacing 1 is the axial inter-surface spacing between the lens L12 and the lens L13. The variable spacing 2 is the axial inter-surface spacing between the lens L13 and the lens L14. The variable spacing 3 is the axial inter-surface spacing between the lens L14 and the lens L15. The variable spacing 4 is the projection distance.

| | | Standard distance | Short distance | Long distance |
|---|---|---|---|---|
| Variable spacing | 1 | 4.4230 | 1.5000 | 15.0214 |
| Variable spacing | 2 | 19.6419 | 22.4144 | 10.0000 |
| Variable spacing | 3 | 4.4783 | 4.6289 | 2.8000 |
| Variable spacing | 4 | −168.0000 | −152.4354 | −283.9986 |

The aspherical coefficients are listed below.

| Surface number | S11 | S12 | S27 | S28 |
|---|---|---|---|---|
| Radius of curvature (R) | 32.0905 | −134.9471 | 38.8539 | 36.1680 |
| Conic constant (K) | −1.94128E+00 | −6.71900E+00 | 0 | −2.149694228 |
| Fourth-order | −1.38254E−05 | 6.71863E−06 | −1.99666E−05 | −1.75494E−05 |
| Sixth-order | −2.83857E−08 | −1.80730E−08 | 2.95006E−09 | 7.63059E−09 |
| Eighth-order | −4.72839E−11 | 1.11637E−11 | −4.48850E−12 | −3.11841E−12 |
| Tenth-order | 4.24189E−13 | 4.04245E−13 | 3.69153E−15 | 6.69179E−16 |
| Twelfth-order | | | −1.40845E−18 | |

| Surface number | S29 | S30 | S34 | S35 |
|---|---|---|---|---|
| Radius of curvature (R) | −35.7720 | 61.7301 | −65.3767 | −44.9827 |
| Conic constant (K) | −0.341543841 | −34.55839799 | −0.770073098 | −6.73401E−01 |
| Fourth-order | 1.05561E−05 | −1.02640E−05 | −2.89382E−07 | 1.92201E−06 |
| Sixth-order | 1.54518E−09 | 8.21068E−09 | −1.03664E−09 | −1.07675E−09 |
| Eighth-order | −5.01740E−12 | −5.35974E−12 | 7.69165E−13 | 3.50601E−13 |
| Tenth-order | 2.39960E−15 | 1.55871E−15 | −2.08201E−16 | −3.79540E−18 |
| Twelfth-order | 8.79249E−19 | 3.19301E−19 | | −1.82590E−20 |
| Fourteenth-order | −1.20369E−21 | −3.97317E−22 | | −9.23744E−25 |
| Sixteenth-order | 3.39597E−25 | 7.66203E−26 | | 9.11590E−28 |

| Surface number | S36 | S37 | S38 |
|---|---|---|---|
| Radius of curvature (R) | −65.3767 | 54.1015 | 142.2508932 |
| Conic constant (K) | −7.70073E−01 | −7.29901E−01 | −10 |
| Fourth-order | −2.89382E−07 | 7.08541E−07 | 2.10912E−06 |
| Sixth-order | −1.03664E−09 | 4.61815E−10 | −5.31390E−10 |
| Eighth-order | 7.69165E−13 | −2.34494E−13 | 1.51858E−13 |
| Tenth-order | −2.08201E−16 | 2.84518E−17 | −2.26420E−17 |
| Twelfth-order | | −1.23445E−21 | 1.77694E−21 |

The projection system 3A according to the present example satisfies Conditional Expressions (1) and (2) below, $$3.5 \leq *(LL+Mr)/imy \times TR \times (1/NA) \leq 6.0 \quad (1)$$

$$TR \leq 0.2 \quad (2)$$

where LL represents the largest radius of the first lens 34, MR represents the largest radius of the reflection surface 42, imy represents the first distance from the optical axis N to the largest image height at the liquid crystal panel 18, Tr represents the throw ratio, which is the quotient of division of the projection distance by the second distance from the optical axis N to the largest image height of the enlarged image at the screen S, and NA represents the numerical aperture of the liquid crystal panel 18.

In the present example, the values described above are listed below.

LL 64.3 mm

MR 49.7 mm imy 11.8 mm

TR 0.114

NA 0.313

(LL+MR)/imy×TR×(1/NA)=3.52 is therefore satisfied, whereby Conditional Expression (1) is satisfied. Since TR=0.114, Conditional Expression (2) is satisfied.

The overlap ratio OL, which is the quotient of division of the first region V1 by the second region V2, is greater than or equal to 10%. That is, the first region V1 overlaps with the second region V2 by an amount greater than or equal to 108. In the present example, the overlap ratio OL is 11%, so that the first region V1 overlaps with the second region V2 by 11%.

Effects and Advantages

The projection system 3A according to the present example enlarges a projection image formed by the liquid crystal panel 18 disposed in the reduction-side conjugate plane and projects the enlarged projection image in the enlargement-side conjugate plane. The projection system 3A according to the present example includes the first optical system 31 and the second optical system 32 sequentially arranged from the reduction side toward the enlargement side. The first optical system 31 includes the diaphragm 51. The second optical system 32 includes the optical element 33, which has the concave reflection surface 42, and the first lens 34, which has negative power, sequentially arranged from the reduction side toward the enlargement side. The intermediate image 30 conjugate with the reduction-side conjugate plane and the enlargement-side conjugate plane is formed between the first optical system 31 and the second optical system 32. The portion at the reduction side of the first optical system 31 form a telecentric portion.

The projection system 3A according to the present example satisfies Conditional Expressions (1) and (2) below, $$3.5 \leq *(LL+Mr)/imy \times TR \times (1/NA) \leq 6.0 \quad (1)$$

$$TR \leq 0.2 \quad (2)$$

where LL represents the largest radius of the first lens 34, MR represents the largest radius of the reflection surface 42, imy represents the first distance from the optical axis N to the largest image height at the liquid crystal panel 18, TR represents the throw ratio, which is the quotient of division of the projection distance by the second distance from the optical axis N to the largest image height of the enlarged image at the screen S, and NA represents the numerical aperture of the liquid crystal panel 18.

The projection system 3A according to the present example satisfies Conditional Expression (2). The projection system 3 therefore has a short focal length. I projection system having a shorter focal length tends to produce larger amounts of aberrations at the enlargement side. It is therefore necessary to increase the effective radius of the enlargement-side lens, through which the beams from the concave mirror obliquely pass, to allow the enlargement-side lens to correct the beams on an image height basis. When the size of the enlargement-side lens is increased to provide a sufficient effective radius, however, the amount of protrusion by which the enlargement-side lens protrudes radially from the first optical axis of the first refractive optical system, resulting in an increase in the diameter of the entire projection system.

To solve the problem described above, the projection system 3A according to the present example satisfies Conditional Expression (1). Suppression of the amount of protrusion by which the first lens 34 protrudes radially from the optical axis N can therefore suppress an increase in the diameter of the entire projection system, whereby the size of the projector that incorporates the projection system 3A can be reduced. Furthermore, the effective diameter of the first lens 34 within which the beams can be corrected on an image height basis can be ensured, while the amount of protrusion by which the first lens 34 protrudes radially from the optical axis N is suppressed. That is, when (LL+MR)/imy×TR×(1/NA) in Conditional Expression (1) is smaller than the lower limit, the lens diameter of the first lens 34 becomes too small relative to TR and 1/NA, so that it is difficult to correct the beams on an image height basis, and sufficient resolution of the projection system 3A is unlikely to be provided. Even when a lens that can provide sufficient resolution can be designed, the lens has problem of low mass producibility because the lens needs to be manufactured with high molding precision. When (LL+MR)/imy×TR×(1/NA) in Conditional Expression (1) is greater than the upper limit, the first lens 34 has an excessively large lens diameter. That is, the amount of protrusion by which the first lens 34 protrudes radially from the optical axis N increases, resulting in an increase in the diameter of the entire projection system. The size of the projector that incorporates the projection system therefore increases.

Example 3 described in JP-A-2020-34690, which is a related-art literature, will now be examined as Comparable Example. The projection system according to Comparable Example includes a first refractive optical system, a reflective optical system, and a second refractive optical system sequentially arranged from the reduction side toward the enlargement side. The first refractive optical system includes a plurality of refractive lenses. The reflective optical system includes a concave mirror and reflects beams from the first refractive optical system toward the side facing the image display device in directions that intersect with the optical axis of the first refractive optical system. The second refractive optical system is formed of a single refractive lens. The refractive lens is an enlargement-side lens located at a position closest to the enlargement side in the projection system. Beams from the concave mirror enter the enlargement-side lens in directions that intersect with the optical axis of the enlargement-side lens. Data on Comparable Example are listed below.

LL 79.7 mm
MR 49.5 mm
imy 11.8 mm
PD 257.6 mm
TR 0.154
NA 0.25

In Comparable Example, TR=0.154. The projection system according to Comparable Example therefore satisfies Conditional Expression (2). In Comparable Example, however, Conditional Expression (1) is expressed in the form of (LL+MR)/imy×TR×(1/NA)=6.02. The projection system according to Comparable Example therefore does not satisfy Conditional Expression (1). Therefore, when the throw ratio is fixed in the present example and Comparative Example, the effective radius of the enlargement-side lens of the projection system according to Comparative Example is greater than the effective radius of the first lens of the projection system 3A according to the present example. That is, the entire projection system according to Comparative Example has a diameter greater than that of the entire projection system 3A according to the present example.

The first optical system 31 in the present example includes the two lenses L13 and L14 (aspherical lenses), which are located at the enlargement side of the diaphragm 51 and each have an aspherical shape. The projection system can therefore correct distortion and image curvature on an image height basis.

The lenses L13 and L14 are each moved in the direction of the optical axis N during focusing. Since the lenses L13 and L14, which correct a variety of aberrations on an image height basis, are moved in the direction of the optical axis N, occurrence of the variety of aberrations during focusing can be suppressed.

The first optical system 31 further includes the cemented doublet L24 at the enlargement side of the diaphragm 51. The chromatic aberrations can therefore be corrected well.

The projection system 3A according to the present example satisfies Conditional Expression (3) below, $$0.3 \leq NR \quad (3)$$

where NA represents the numerical aperture of the liquid crystal panel 18.

The projection system 3A according to the present example, in which NA=0.313, satisfies s Conditional Expression (3). A bright projection system can therefore be achieved.

In the projection system 3A according to the present example, the reflection surface 42 and the first lens 34 are responsible for the function of enlarging the intermediate image 30 and bringing the enlarged image into focus at the screen S. The beams from the reflection surface 42 enter the first lens 34 in directions that intersect with the optical axis of the first lens 34. In the configuration described above, a large-image-height luminous flux is reflected off the portion, of the reflection surface 42, farthest from the optical axis N at a large angle of reflection with respect to the optical axis N, and is incident on the portion, of the first lens 34, farthest from the optical axis. In particular, the smaller the distance between the first lens 34 and the reflection surface 42, the larger the angle of the large-image height-luminous flux reflected off the reflection surface 42 with respect to the optical axis N. In this case, the first lens 34 has a problem of a decrease in the amount of light contained in a peripheral luminous flux including the large-image-height luminous flux in accordance with the cosine fourth law. Therefore, to ensure a sufficient amount of light contained in the peripheral luminous flux including the large-image-height luminous flux, the pupil in the large-image-height luminous flux needs to be enlarged. In this case, it is conceivable to increase the size of the first lens 34, which is the enlargement-side last lens, to reliably capture the large-image-height luminous flux, but this solution undesirably increases the size of the first lens 34 and therefore increases the size of the projection system.

To solve the problem described above, the projection system 3A according to the present example includes the first region V1 and the second region V2, which overlap with each other. The first region V1 is a region as a result of projection of the luminous flux passage region of the reduction-side lens surface 34*a* of the first lens 34 onto the optical axis N, and the second region V2 is a region as a result of projection of the luminous flux passage region of the reflection surface 42 onto the optical axis N. That is, the portion, of the first lens 34, on which the high-image-height luminous flux is incident and the portion, of the reflection surface 42, which reflects the high-image-height luminous flux overlap with each other in the direction perpendicular to the optical axis N. Therefore, even when the distance between the first lens 34 and the reflection surface 42 is shortened, but when the first region V1 and the second region V2 overlap with each other, the first lens 34 is likely to capture the high-image-height luminous flux formed of the beams reflected off the reflection surface 42. As a result, the projection system 3A according to the present example allows suppression of an increase in the lens diameter of the first lens 34 and reduction in the focal length of the projection system. In Comparative Example described above, in which the first region V1 and the second region V2 do not overlap with each other, the lens diameter of the refractive lens of the second refractive optical system in Comparison Example is greater than the lens diameter of the first lens 34 of the projection system 3A according to the present example.

In the projection system 3A according to the present example, the first region V1 overlaps with the second region V2 by 11%. Ensuring that the amount of overlap is greater than or equal to 10% therefore ensures that the amount of light contained in the peripheral luminous flux is about 40%. The projection system 3A can therefore project an entirely bright enlarged image having a bright periphery.

Figure 3:
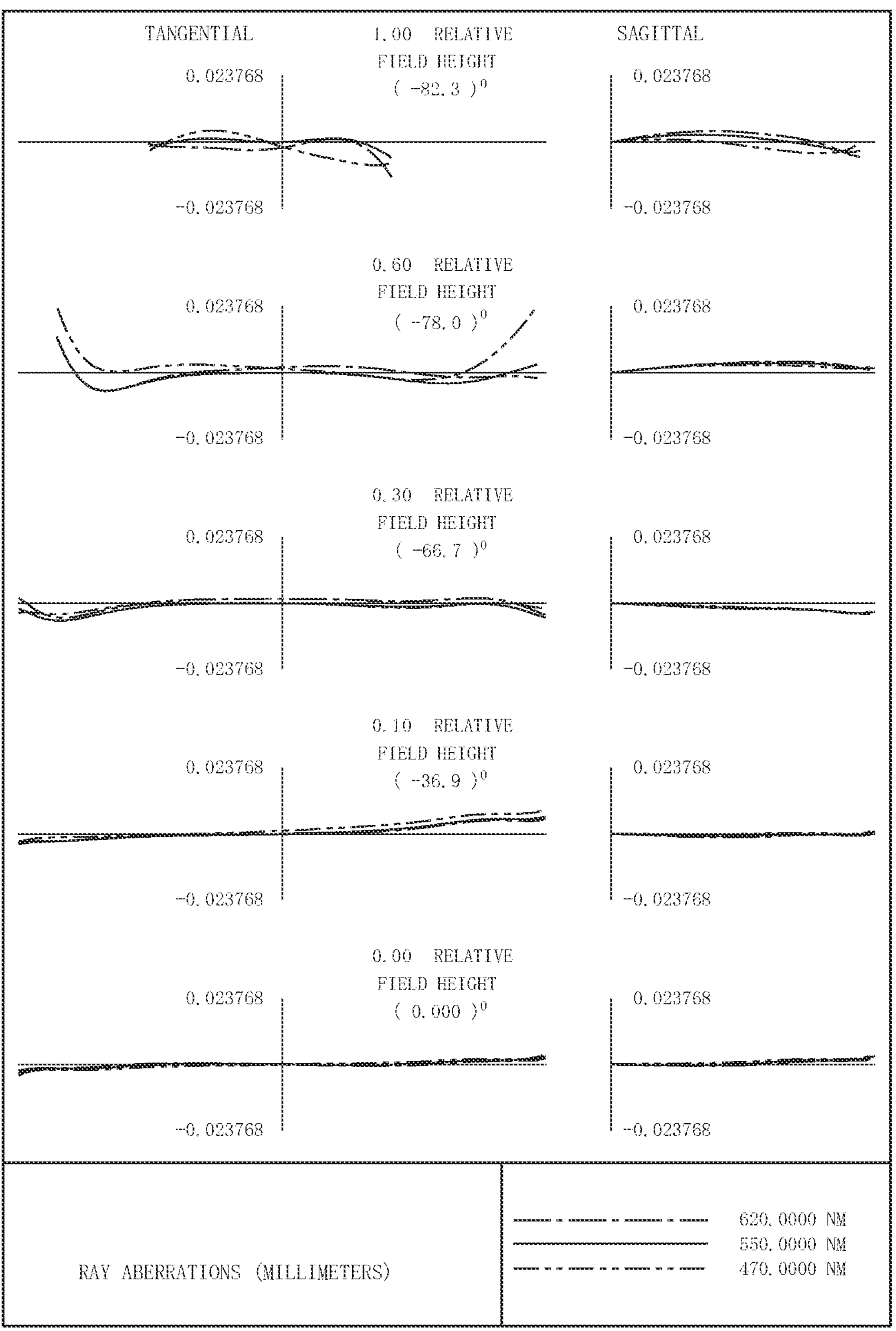
FIG. 3 shows lateral aberrations produced by the projection system according to Example 1 set at a standard distance.
Figure 4:
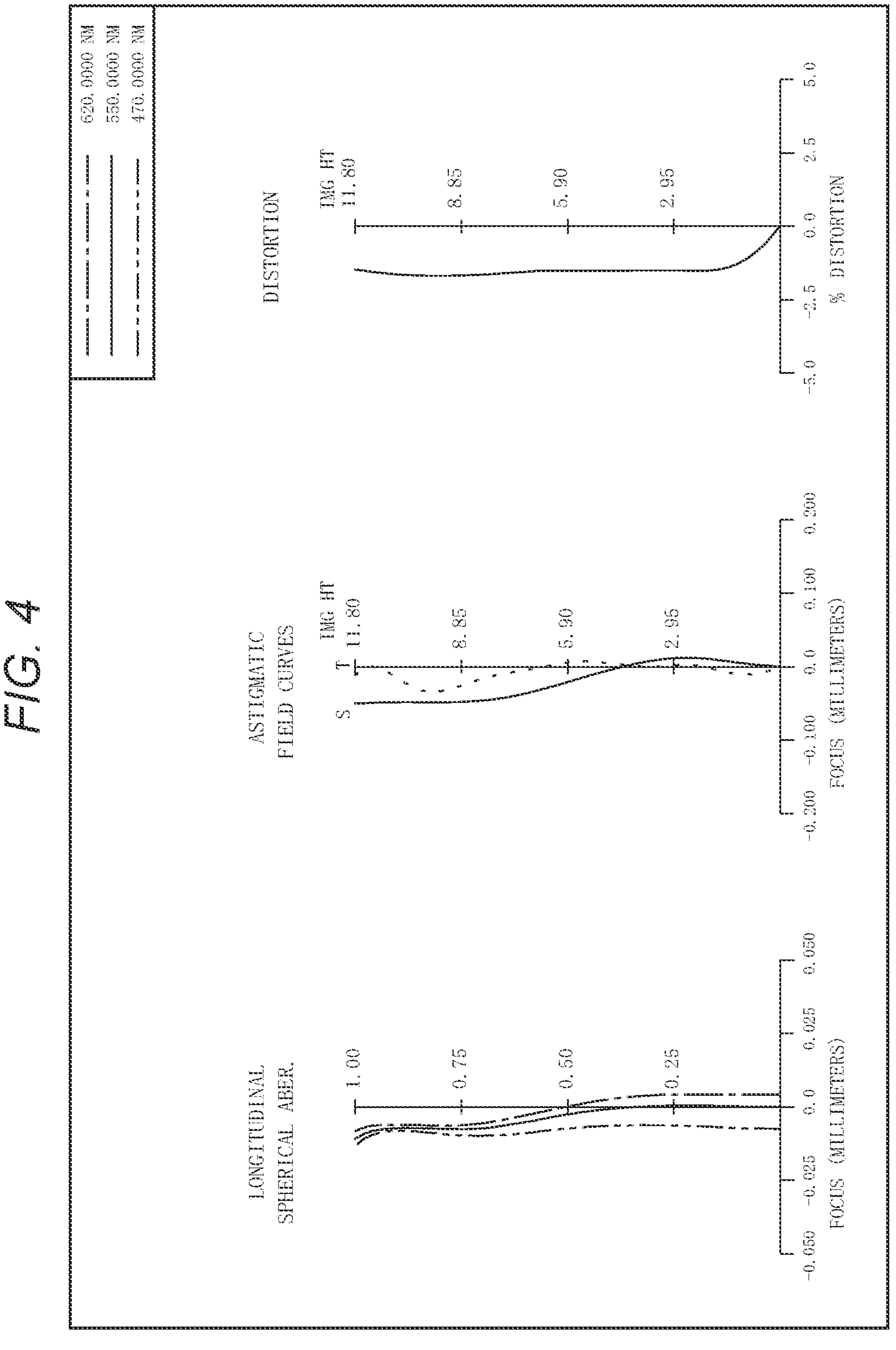
FIG. 4 shows spherical aberration, astigmatism, and distortion produced by the projection system according to Example 1 set at the standard distance.
Figure 5:
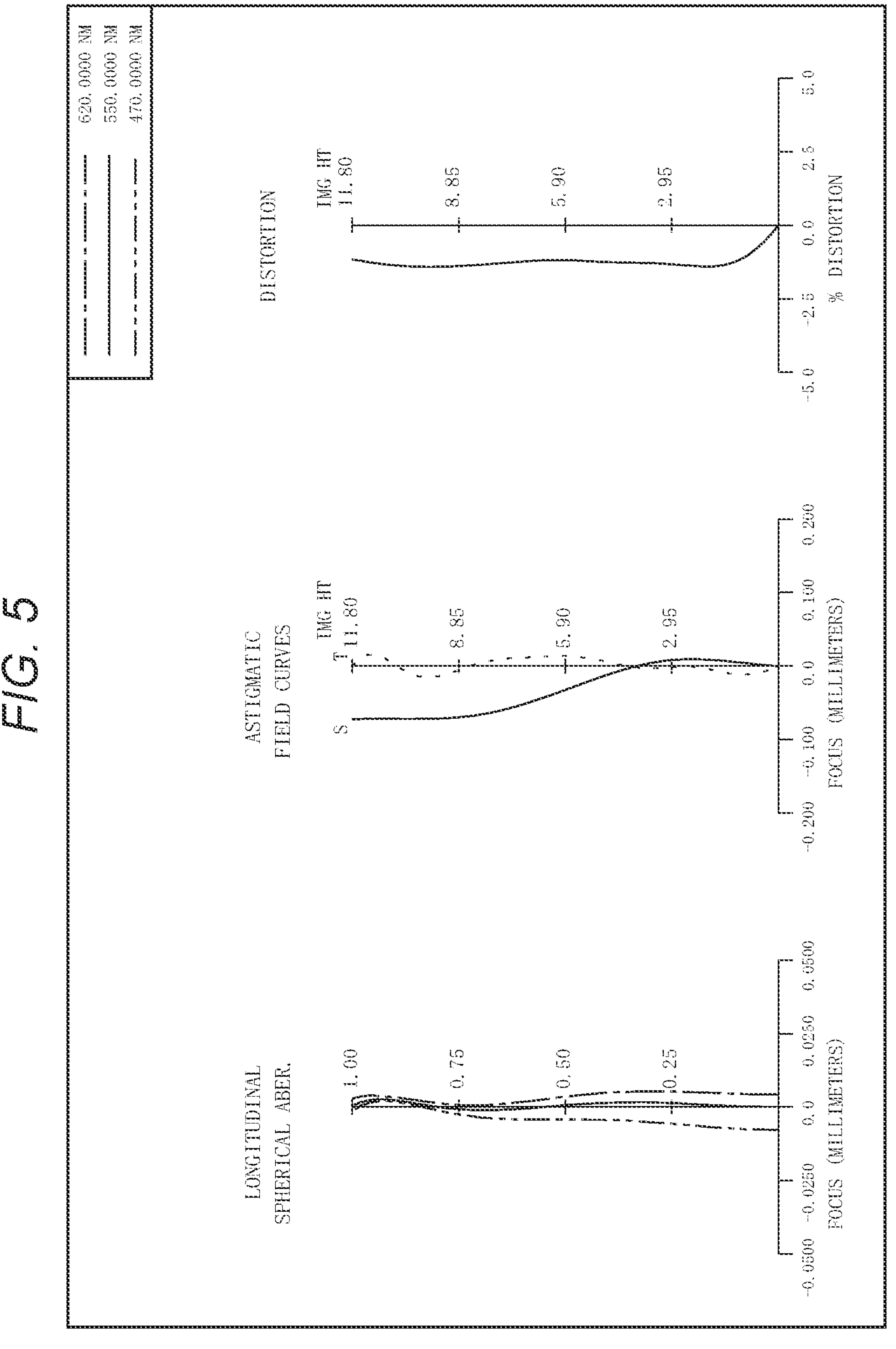
FIG. 5 shows the spherical aberration, astigmatism, and distortion produced by the projection system according to Example 1 set at a short distance.
Figure 6:
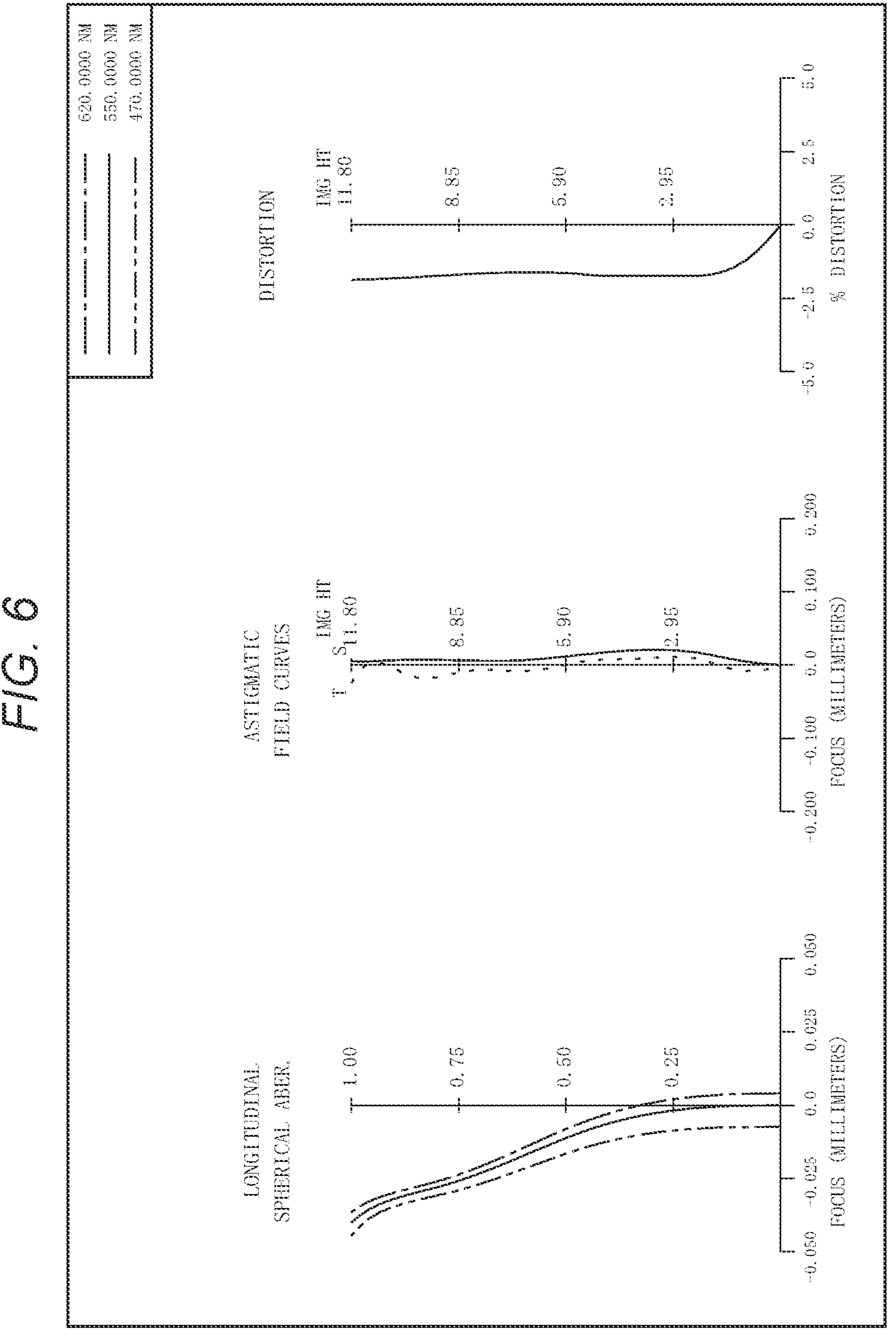
FIG. 6 shows the spherical aberration, astigmatism, and distortion produced by the projection system according to Example 1 set at a long distance.

FIG. 3 shows lateral aberrations produced by the projection system 3A set at the standard distance. FIG. 4 shows the spherical aberration, astigmatism, and distortion produced by the projection system 3A set at the standard distance. FIG. 5 shows the spherical aberration, astigmatism, and distortion produced by the projection system 3A set at the short distance. FIG. 6 shows the by the projection system 3A set at the long distance. The projection system 3A according to the present example produces an enlarged image having suppressed aberrations, as shown in FIGS. 3 to 6.

Example 2

Figure 7:
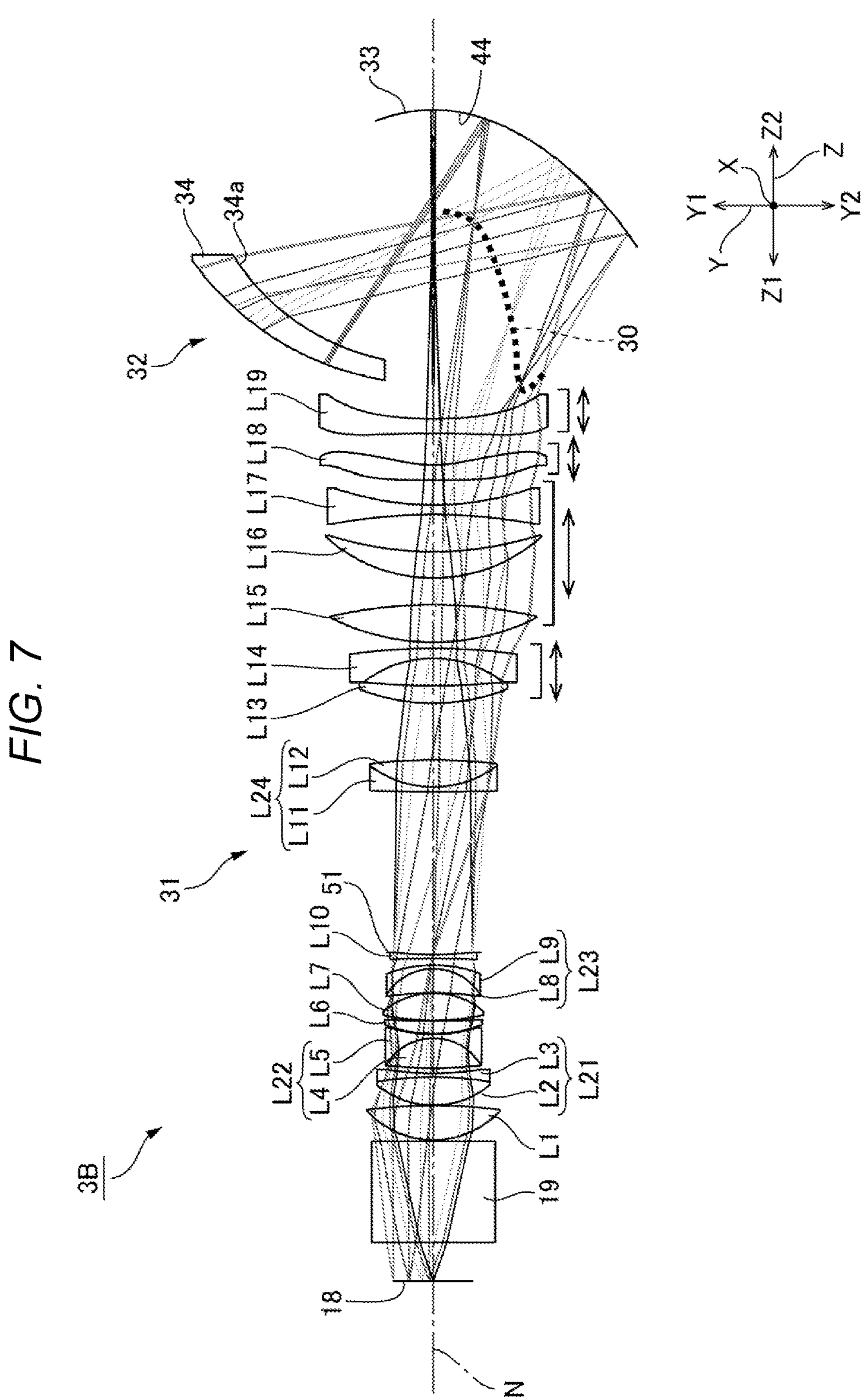
FIG. 7 is a beam diagram showing beams passing through the projection system according to Example 2.

FIG. 7 is a beam diagram of the projection system 3B according to Example 2. The projection system 3B according to the present example is formed of a first optical system 31 and a second optical system 32 sequentially arranged from the reduction side toward the enlargement side, as shown in FIG. 7. The second optical system 32 is disposed on an optical axis N of the first optical system 31.

The first optical system 31 is a refractive optical system. The first optical system 31 is formed of nineteen lenses L1 to L19. The lenses L1 to L19 are arranged in the presented order from the reduction side toward the enlargement side. A diaphragm 51 is disposed between the lens L10 and the lens L11.

The lens L4 has aspherical shape at the reduction side. The lens L18 has aspherical shapes at opposite sides. The lens L19 has aspherical shapes at opposite sides. The lens L2 and the lens L3 are bonded to each other into a cemented doublet L21. The lens L4 and the lens L5 are bonded to each other into a cemented doublet L22. The lens L8 and the lens 19 are bonded to each other into a cemented doublet L23. The lens L11 and the lens L12 are bonded to each other into a cemented doublet L24.

The second optical system 32 includes an optical element 33 and a first lens 34. The optical element 33 and the first lens 34 are arranged in the presented order from the reduction side toward the enlargement side. The optical element 33 has a reflection surface 44, which faces the reduction side. The reflection surface 44 has a concave shape recessed in the second direction Z2. The reflection surface 44 has an aspherical shape. The reflection surface 44 is located at the lower side Y2 of the optical axis N, as shown in FIG. 7. The reflection surface 44 is formed by providing the outer surface, in the first direction Z1, of the optical element 33 with a reflection coating layer (reflection layer). The reflection surface 44 reflects light at the surface, facing in the direction Z1, of the optical element 33.

The first lens 34 is disposed between the lens L19 and the optical element 33 in the direction of the optical axis N and at the upper side Y1 of the optical axis N. The first lens 34 has negative power. The first lens 34 has a convex enlargement-side surface and a concave reduction-side surface. The first lens 34 has aspherical shapes at opposite sides.

The first region V1 and the second region V2 overlap with each other in the second optical system 32 of the projection system 3A according to Example 1, but the regions do not overlap with each other in the second optical system 32 of the projection system 3B according to the present example.

The liquid crystal panel 18 of the image formation unit 2 is disposed in the reduction-side conjugate plane of the projection system 3B. The screen S is disposed in the enlargement-side conjugate plane of the projection system 3B.

The liquid crystal panel 18 forms a projection image in an image formation plane perpendicular to the optical axis N of the first optical system 31. The liquid crystal panel 18 is disposed in a position offset from the optical axis N of the first optical system 31 toward the upper side Y1. The projection image is therefore formed in a position offset from the optical axis N toward the upper side Y1.

The beams from the liquid crystal panel 18 pass through the first optical system 31 and the second optical system 32 in the presented order. Between the first optical system 31 and the second optical system 32, the beams pass through the lower side Y2 of the optical axis N. The beams are therefore directed through the second optical system 32 toward the reflection surface 44. The beams having reached the reflection surface 44 are deflected back in the first direction Z1 towards the upper side Y1. The beams deflected back by the reflection surface 44 cross the optical axis N toward the upper side Y1 and travels toward the first lens 34. The beams passing through the first lens 34 are widened by the first lens 34 and reach the screen S.

An intermediate image 30 is formed between the lens L16 and the reflection surface 44.

In the projection system 3B, the portion at the reduction side of the first optical system 31 is a telecentric portion.

The projection system 3B has a changeable projection distance. When the projection distance is changed, seven lenses of the first optical system 31, the lenses L13 to L19, are moved along the optical axis N for focusing. In the focusing, the lenses L13 and L14 are moved as a unit. In the focusing, the lenses L15, L16, and L17 are moved also as a unit.

Data on the projection system 3B are listed below,

LL 70.3 mm
MR 60.0 mm
imy 11.8 mm
scy 1475 mm
M 125
PD 168 mm
TR 0.114
NA 0.313
OL −17% where LL represents the largest radius of the first lens 34, MR represents the largest radius of the reflection surface 44, imy represents a first distance from the optical axis N to the largest image height at the liquid crystal panel 18, scy represents a second distance from the optical axis N to the largest image height of the enlarged image projected on the screen S, M represents a projection magnification that is the quotient of division of the second distance by the first distance, PD represents a projection distance that is the distance from the first lens 34 to the screen S, TR represents a throw ratio that is the quotient of division of the projection distance by the second distance, NA represents the numerical aperture of the liquid crystal panel 18, and OL represents an overlap ratio that is the quotient of division of the first region by the second region.

Data on the lenses of the projection system 3B are listed below. The surfaces of the lenses are numbered sequentially from the reduction side toward the enlargement side. Reference characters are given to the liquid crystal the first lens, and the screen. Data labeled with a surface number that does not correspond to any of the liquid crystal panel, the dichroic prism, the lenses, the optical element, the first lens, and the screen is dummy data. Reference character R represents the radius of curvature. Reference character D represents the axial inter-surface spacing. Reference character C represents the aperture radius, and twice the aperture radius is the diameter of the lens surface. Reference characters R, D, and C are each expressed in millimeters.

| Reference character | Surface number | Shape | R | D | Glass material | Refraction/ Reflection | C |
|---|---|---|---|---|---|---|---|
| 18 | 0 | Spherical | Infinity | 12.0000 | | Refraction | 0.0000 |
| | 1 | Spherical | Infinity | 0.0000 | | Refraction | 13.7731 |
| 19 | 2 | Spherical | Infinity | 31.0600 | SBSL7_OHARA | Refraction | 13.7731 |
| | 3 | Spherical | Infinity | 0.5000 | | Refraction | 17.1118 |

-continued

| Reference character | Surface number | Shape | R | D | Glass material | Refraction/ Reflection | C |
|---|---|---|---|---|---|---|---|
| L1 | 4 | Spherical | 26.6288 | 10.4696 | SFPL51_OHARA | Refraction | 18.4088 |
| | 5 | Spherical | −150.1579 | 0.1000 | | Refraction | 18.0025 |
| L2 | 6 | Spherical | 25.5623 | 8.5438 | SFPL51_OHARA | Refraction | 15.5000 |
| L3 | 7 | Spherical | −97.0389 | 1.2000 | SLAH55V_OHARA | Refraction | 14.5832 |
| | 8 | Spherical | 85.4686 | 1.5000 | | Refraction | 13.5904 |
| L4 | 9 | Aspherical | 66.9350 | 9.2467 | SFPL51_OHARA | Refraction | 13.1508 |
| L5 | 10 | Spherical | −15.9986 | 1.2000 | SLAH58_OHARA | Refraction | 12.3029 |
| | 11 | Spherical | 41.6431 | 0.2000 | | Refraction | 12.8263 |
| L6 | 12 | Spherical | 38.0827 | 4.0030 | LBAL42_OHARA | Refraction | 13.0543 |
| | 13 | Spherical | 318.3152 | | 0.1000 | Refraction | 13.2827 |
| L7 | 14 | Spherical | 70.4405 | 8.4210 | SFSL5_OHARA | Refraction | 13.5227 |
| | 15 | Spherical | −22.3532 | 0.1000 | | Refraction | 13.6989 |
| | 16 | Spherical | Infinity | 0.0000 | | Refraction | 12.4435 |
| L8 | 17 | Spherical | −84.9967 | 7.3497 | EFD1_HOYA | Refraction | 12.6701 |
| L9 | 18 | Spherical | −15.9906 | 1.2000 | TAFD37_HOYA | Refraction | 12.5122 |
| | 19 | Spherical | −36.1966 | 2.0000 | | Refraction | 12.7989 |
| L10 | 20 | Spherical | −244.2902 | 1.2000 | SLAH55V_OHARA | Refraction | 11.7933 |
| | 21 | Spherical | 97.6234 | 0.6890 | | Refraction | 11.5565 |
| 51 | 22 | Spherical | Infinity | 49.3148 | | Refraction | 11.5563 |
| | 23 | Spherical | Infinity | 0.0000 | | Refraction | 16.0000 |
| L11 | 24 | Spherical | 603.4243 | 1.5000 | SFSL5_OHARA | Refraction | 16.0682 |
| L12 | 25 | Spherical | 30.3502 | 8.2708 | 603703.3642 | Refraction | 17.4145 |
| | 26 | Spherical | −159.7097 | Variable spacing 1 | | Refraction | 17.6353 |
| L13 | 27 | Spherical | 58.3785 | 5.2371 | SFSL5_OHARA | Refraction | 20.5420 |
| | 28 | Spherical | 211.5489 | 8.4167 | | Refraction | 20.4448 |
| L14 | 29 | Spherical | −32.8105 | 3.0000 | SLAH60_OHARA | Refraction | 20.4418 |
| | 30 | Spherical | −179.0439 | Variable spacing 2 | | Refraction | 23.3194 |
| L15 | 31 | Spherical | 65.8625 | 11.5160 | SFSL5_OHARA | Refraction | 29.4810 |
| | 32 | Spherical | −132.6893 | 8.2607 | | Refraction | 29.6197 |
| L16 | 33 | Spherical | 46.7969 | 8.1128 | 580360.3963 | Refraction | 31.0392 |
| | 34 | Spherical | 99.4438 | 11.4077 | | Refraction | 30.7171 |
| L17 | 35 | Spherical | −158.6923 | 3.0000 | 845147.2965 | Refraction | 29.8409 |
| | 36 | Spherical | 86.1824 | Variable spacing 3 | | Refraction | 29.4729 |
| L18 | 37 | Aspherical | 528.0372 | 4.5000 | E48R_ZEON | Refraction | 31.3346 |
| | 38 | Aspherical | 33.7665 | Variable spacing 4 | | Refraction | 31.9279 |
| L19 | 39 | Aspherical | 380.2495 | 4.5000 | E48R_ZEON | Refraction | 32.2460 |
| | 40 | Aspherical | 104.5568 | Variable spacing 5 | | Refraction | 31.1074 |
| 44 | 41 | Aspherical | −42.5636 | −78.3294 | | Reflection | 58.3033 |
| 34 | 42 | Spherical | 69.4353 | −6.0000 | SBSL7_OHARA | Refraction | 59.6267 |
| | 43 | Spherical | 86.2250 | 0.0000 | | Refraction | 70.3493 |
| | 44 | Spherical | Infinity | Variable spacing 6 | | Refraction | 317.5369 |
| S | 45 | Spherical | Infinity | 0.0000 | | Refraction | 2320.5066 |

The projection system 3B according to the present example has a changeable projection distance selected from a standard distance, a short distance shorter than the standard distance, and a long distance longer than the standard distance. When the projection distance is changed, seven lenses of the first optical system 31, the lenses L13 to L19, are moved along the optical axis N for focusing.

The table below shows the variable spacings 1, 2, 3, 4, 5, and 6 at the projection distances where the focusing is performed. The variable spacing 1 is the axial inter-surface spacing between the lens L12 and the lens L13. The variable spacing 2 is the axial inter-surface spacing between the lens L14 and the lens L15. The variable spacing 3 is the axial inter-surface spacing between the lens L17 and the lens L18. The variable spacing 4 is the axial inter-surface spacing between the lens L18 and the lens L19. The variable spacing 5 is the axial inter-surface spacing between the lens L19 and the reflection surface 44. The variable spacing 6 is the projection distance.

| | | Standard distance | Short distance | Long distance |
|---|---|---|---|---|
| Variable spacing | 1 | 17.5493 | 17.3144 | 17.7167 |
| Variable spacing | 2 | 1.9816 | 1.5000 | 3.1094 |
| Variable spacing | 3 | 7.6021 | 7.6917 | 7.7992 |
| Variable spacing | 4 | 9.7204 | 10.4580 | 8.0000 |

-continued

| | | Standard distance | Short distance | Long distance |
|---|---|---|---|---|
| Variable spacing | 5 | 95.0272 | 94.9165 | 95.0000 |
| Variable spacing | 6 | −168.0000 | −149.0000 | −299.0000 |

The aspherical coefficients are listed below.

| Surface number | S9 | S37 | S38 |
|---|---|---|---|
| Radius of curvature (R) | 66.9350 | 528.0372 | 33.7665 |
| Conic constant (K) | 1.99808E+01 | 0.00000E+00 | −0.933898063 |
| Fourth-order | −3.51935E−05 | 1.29656E−06 | −2.77972E−05 |
| Sixth-order | −3.84869E−08 | 1.76500E−08 | 3.28971E−08 |
| Eighth-order | 1.64277E−10 | −2.92156E−11 | −1.92879E−11 |
| Tenth-order | −2.73714E−13 | 2.18211E−14 | 2.74697E−15 |
| Twelfth-order | | −8.19357E−18 | |

| Surface number | S39 | S40 | S41 |
|---|---|---|---|
| Radius of curvature (R) | −380.2495 | 104.5568 | −42.5636 |
| Conic constant (K) | 90 | −1 | −0.642670804 |
| Fourth-order | −1.04601E−06 | −3.06455E−06 | 1.27431E−06 |
| Sixth-order | 5.85943E−09 | 1.95488E−08 | −2.26894E−10 |
| Eighth-order | −3.64606E−12 | −2.55133E−11 | 5.16584E−14 |
| Tenth-order | 8.78722E−16 | 9.61539E−15 | 6.33283E−20 |
| Twelfth-order | 1.72449E−18 | 5.52402E−18 | −3.49736E−22 |
| Fourteenth-order | −1.60803E−21 | −1.82570E−21 | −2.74244E−25 |
| Sixteenth-order | 4.60964E−25 | −1.51405E−24 | 6.78070E−29 |

The projection system 3B according to the present example satisfies Conditional Expressions (1) and (2) below, $$3.5 \leq *(LL+Mr)/imy \times TR \times (1/NA) \leq 6.0 \quad (1)$$

$$TR \leq 0.2 \quad (2)$$

where LL represents the largest radius of the first lens 34, MR represents the largest radius of the reflection surface 44, imy represents the first distance from the optical axis N to the largest image height at the liquid crystal panel 18, TR represents the throw ratio that is the quotient of division of the projection distance by the second distance from the optical axis N to the largest image height of the enlarged image at the screen S, and NA represents the numerical aperture of the liquid crystal panel 18.

In the present example, the values described above are listed below.

LL 70.3 mm
MR 60.0 mm
imy 11.8 mm
TR 0.114
NA 0.313

(LL+MR)/imy×TR×(1/NA)=4.02 is therefore satisfied, whereby Conditional Expression (1) is satisfied. Since TR=0.114, Conditional Expression (2) is satisfied.

Effects and Advantages

In projection system 3B according to the present example, the first optical system 31 includes the two lenses L18 and L19 (aspherical lenses), which are located at the enlargement side of the diaphragm 51 and each have an aspherical shape. The projection system 3B can therefore correct distortion and image curvature on an image height basis.

The lenses L18 and L19 are each moved in the direction of the optical axis N during focusing. Since the lenses L18 and L19, which correct a variety of aberrations on an image height basis, are moved in the direction of the optical axis N, occurrence of the variety of aberrations during focusing can be suppressed.

The first optical system 31 further includes the cemented doublet L24 at the enlargement side of the diaphragm 51. The chromatic aberrations can therefore be corrected well.

The projection system 3B according to the present example satisfies Conditional Expression (3) below, $$0.3 \leq NR \quad (3)$$

where NA represents the numerical aperture of the liquid crystal panel 18.

The projection system 3B according to the present example, in which NA=0.313, satisfies Conditional Expression (3). A bright projection system can therefore be achieved.

In the projection system 3B according to the present example, the reflection surface 44 is provided with a reflection coating layer (reflection layer). Since the reflection surface 42 in Example 1 is provided inside the optical element 33, the accuracy of the shape of the second surface 37, at which the reflection surface 42 is provided, depends on the accuracy of the shape of the optical element 33. That is, to improve the accuracy of the shape of the second surface 37, the accuracy of the shape of the first surface 36 also needs to be improved. In contrast, since the reflection surface 44 of the projection system 3B according to the present example is provided at the outer surface of the optical element 33, only the accuracy of the shape of the outer surface of the optical element 33 needs to be improved. The accuracy of the shape of the reflection surface 44 in the present example is therefore readily improved as compared with that of the reflection surface 42 in Example 1.

In Example 1, after the formation of the optical element 33, a reflection coating layer is formed at the second surface 37 of the optical element 33 to form the reflection surface 42. In this process, a support film layer needs to be provided between the reflection coating layer and the second surface 37. Although the thus provided support film layer causes the reflection coating layer to be unlikely to peel off the second surface 37, the interposed support film layer tends to lower the optical performance of the reflection surface 42, so that the optical performance of the reflection surface 42 tends to vary in the manufacturing process. In contrast, in the projection system 3B according to the present example, the support film layer is provided on the side opposite from the reflection surface of the reflection coating layer, whereby the optical performance of the reflection surface 44 is unlikely to deteriorate. Stable optical performance of the reflection surface 44 is therefore likely to be achieved during the manufacture of the optical element 33.

Figure 8:
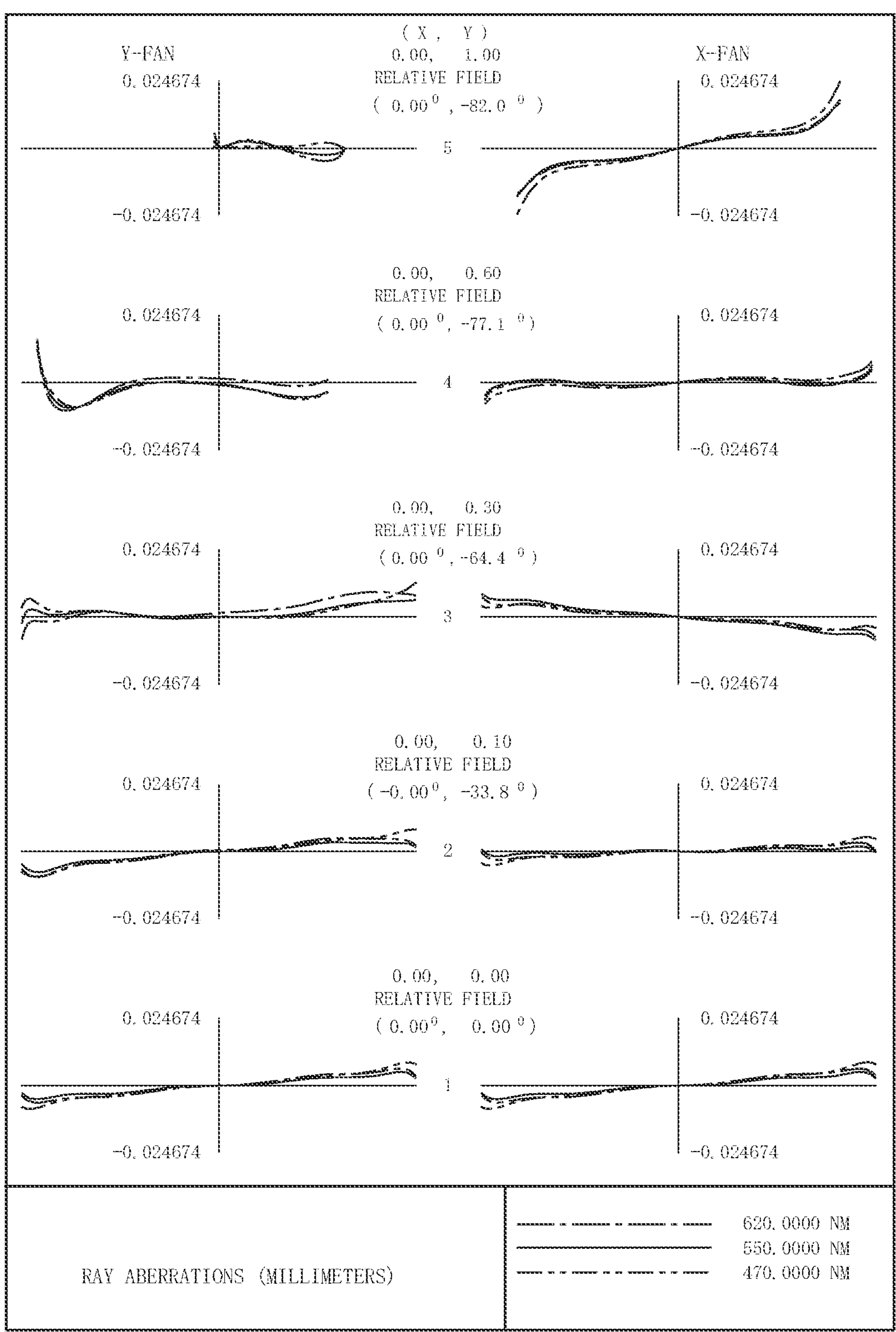
FIG. 8 shows the lateral aberrations produced by the projection system according to Example 2 set at the standard distance.
Figure 9:
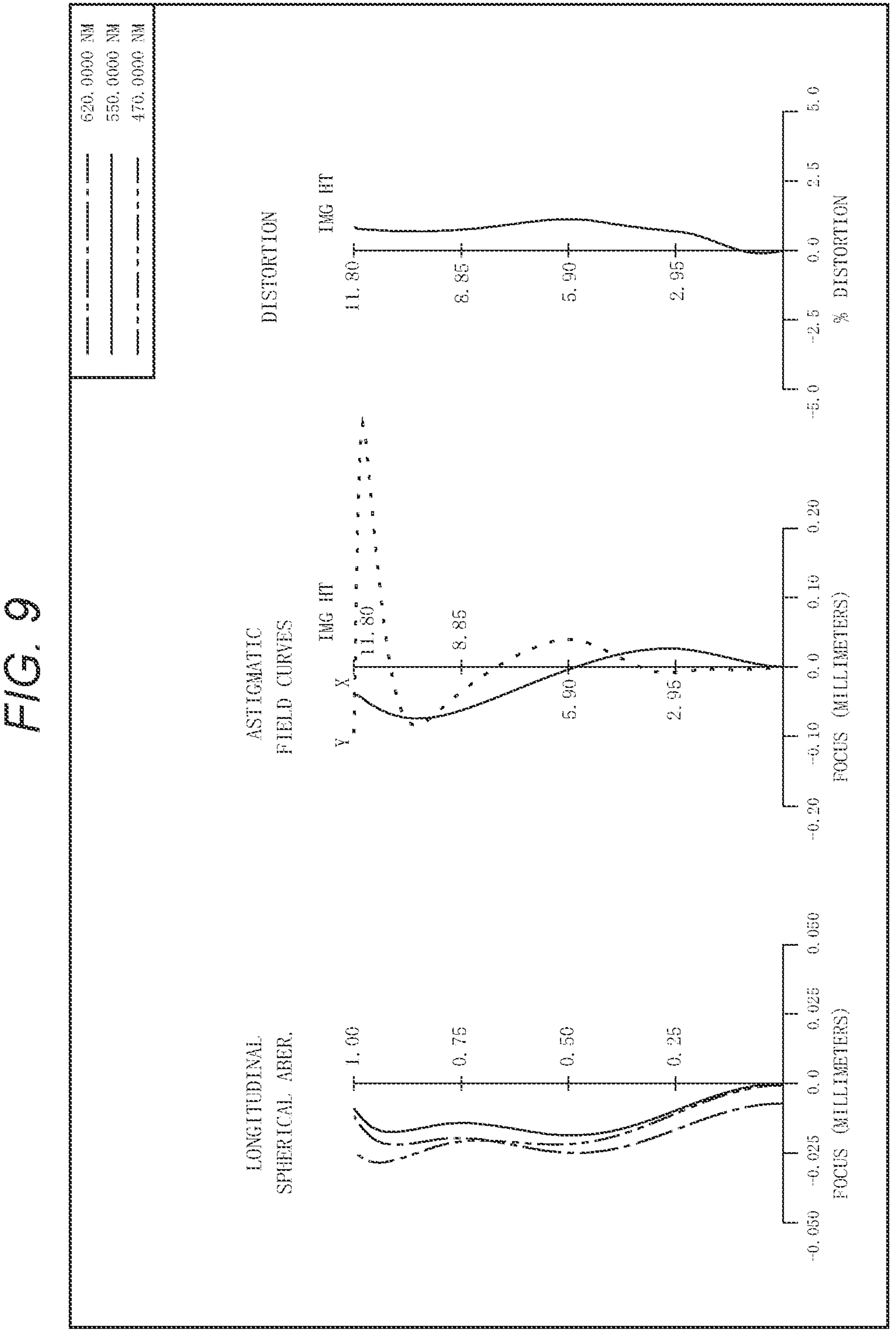
FIG. 9 shows the spherical aberration, astigmatism, and distortion produced by the projection system according to Example 2 set at the standard distance.
Figure 10:
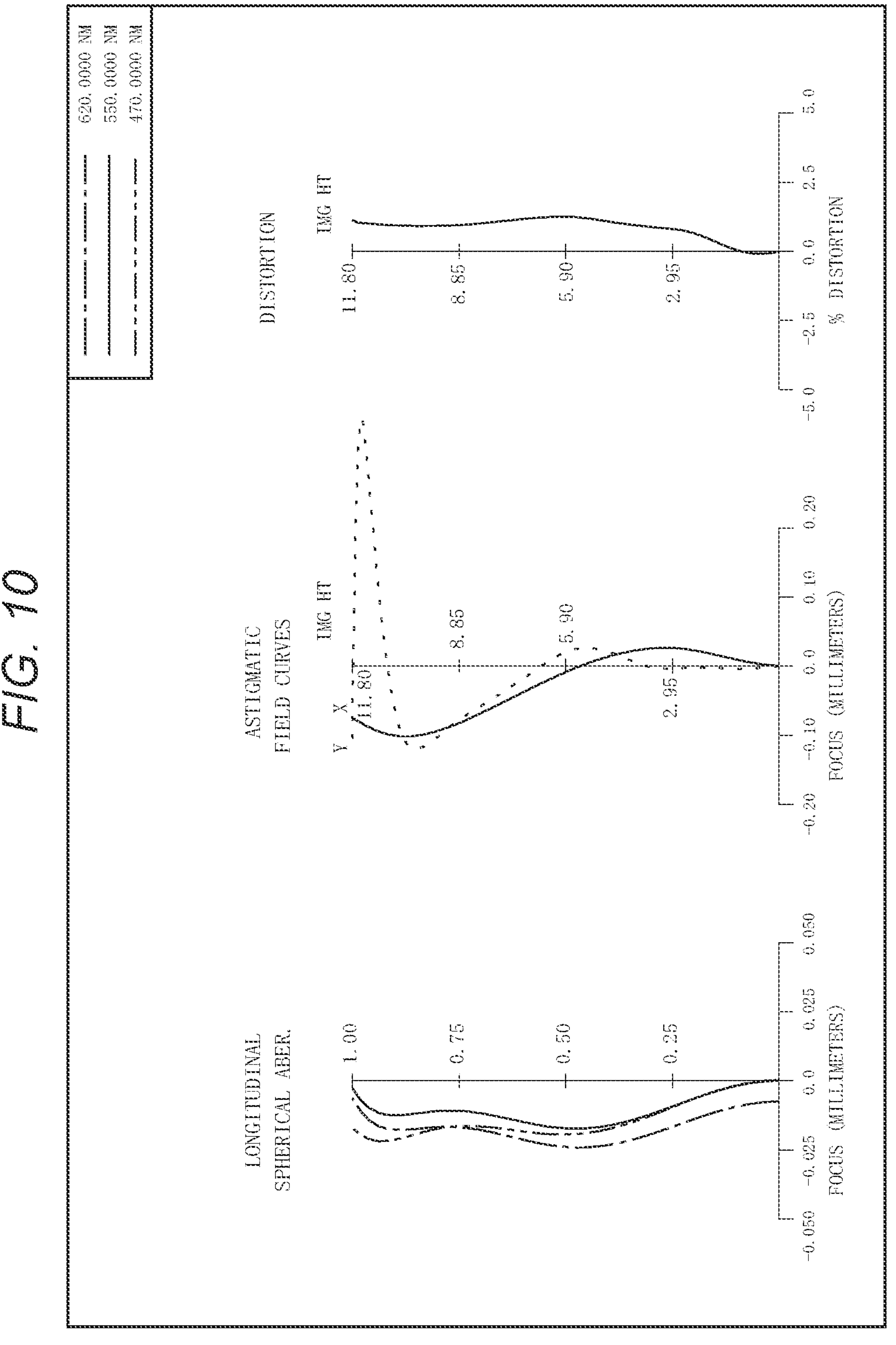
FIG. 10 shows the spherical aberration, astigmatism, and distortion produced by the projection system according to Example 2 set at the short distance.
Figure 11:
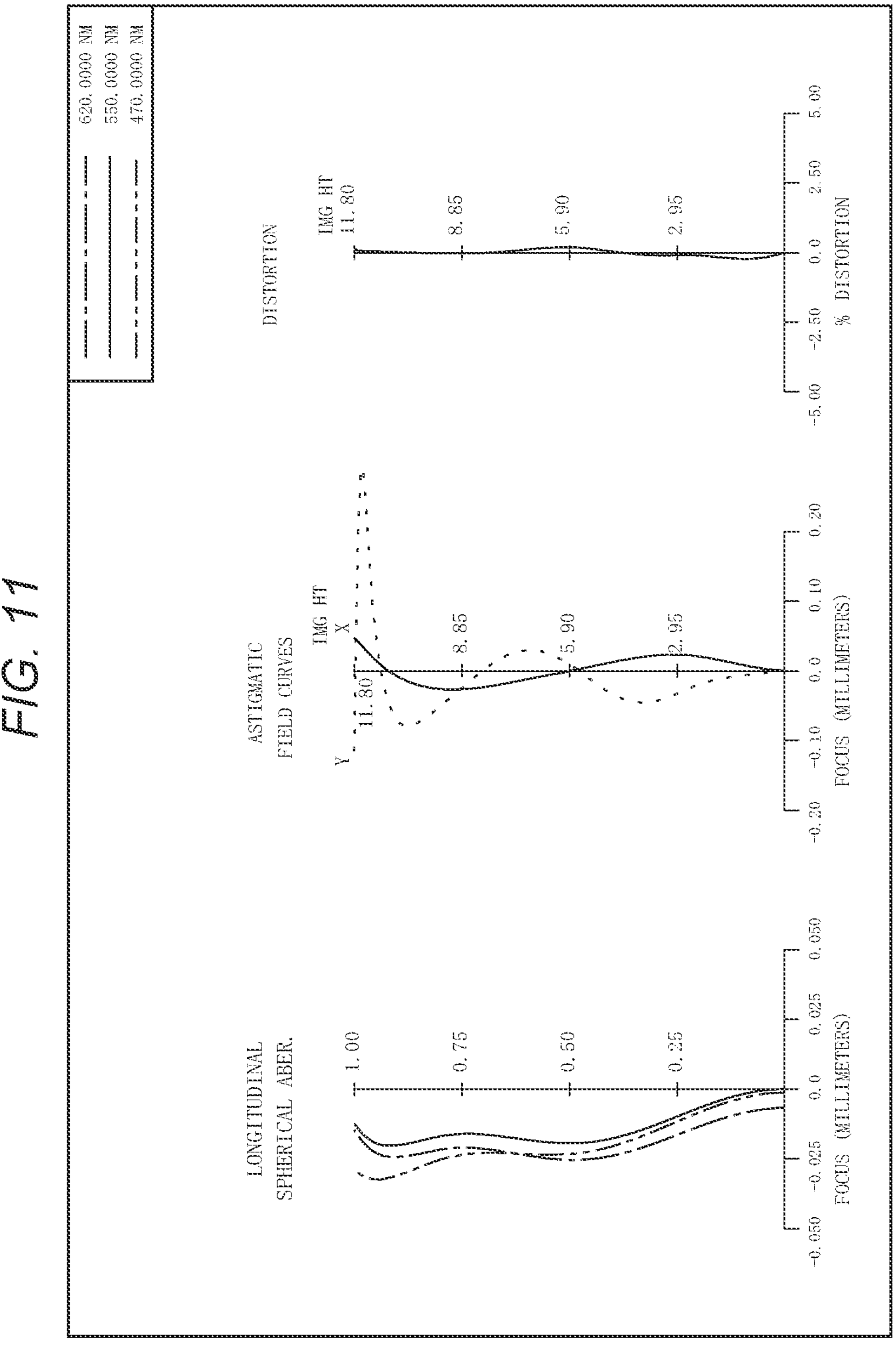
FIG. 11 shows the spherical aberration, astigmatism, and distortion produced by the projection system according to Example 2 set at the long distance.

The projection system 3B according to the present example, which satisfies Conditional Expressions (1) and (2), can provide the same effects and advantages as those provided by the projection system 3A according to Example 1. FIG. 8 shows the lateral aberrations produced by the projection system 3B set at the standard distance. FIG. 9 shows the spherical aberration, astigmatism, and distortion produced by the projection system 3B set at the standard distance. FIG. 10 shows the spherical aberration, astigmatism, and distortion produced by the projection system 3B set at the short distance. FIG. 11 shows the spherical aberration, astigmatism, and distortion produced by the projection system 3B set at the long distance. The projection system 3B according to the present example produces an enlarged image having suppressed aberrations, as shown in FIGS. 8 to 11.

Example 3

Figure 12:
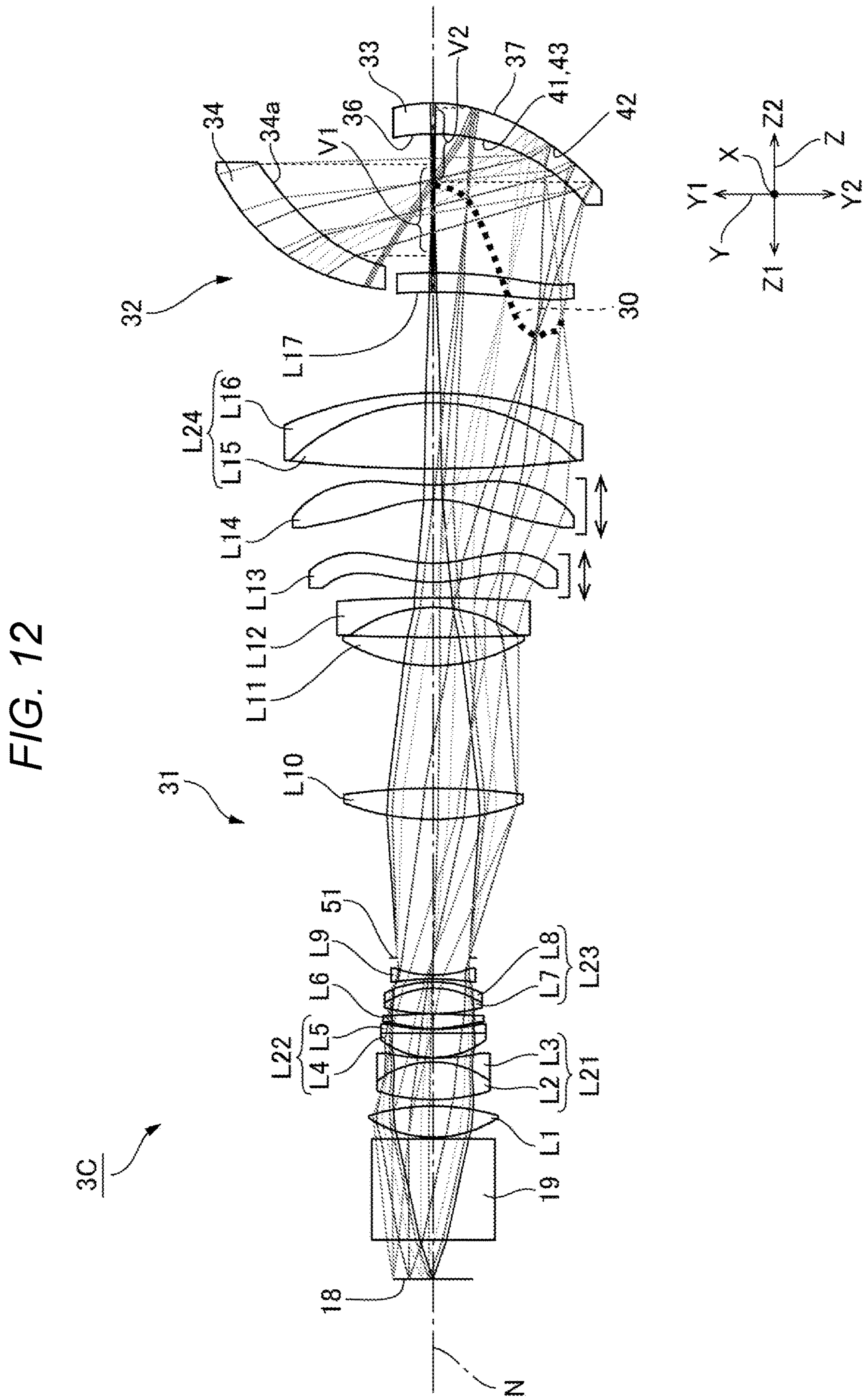
FIG. 12 is a beam diagram showing beams passing through the projection system according to Example 3.

FIG. 12 is a beam diagram showing beams passing through a projection system 3C according to Example 3. The projection system 3C according to the present example is formed of a first optical system 31 and a second optical system 32 sequentially arranged from the reduction side toward the enlargement side, as shown in FIG. 12. The second optical system 32 is disposed on an optical axis N of the first optical system 31.

The first optical system 31 is a refractive optical system. The first optical system 31 is formed of seventeen lenses L1 to L17. The lenses L1 to L17 are arranged in the presented order from the reduction side toward the enlargement side. A diaphragm 51 is disposed between the lens L9 and the lens L10.

The lens L6 has aspherical shapes at opposite sides. The lens L13 has aspherical shapes at opposite sides. The lens L14 has aspherical shapes at opposite sides. The lens L17 has aspherical shapes at opposite sides. The lens L2 and the lens L3 are bonded to each other into a cemented doublet L21. The lens L4 and the lens L5 are bonded to each other into a cemented doublet L22. The lens L7 and the lens L8 are bonded to each other into a cemented doublet L23. The lens L15 and the lens L16 are bonded to each other into a cemented doublet L24.

The second optical system 32 includes an optical element 33 and a first lens 34. The optical element 33 and the first lens 34 are arranged in the presented order from the reduction side toward the enlargement side. The optical element 33 has a first surface 36, which faces the reduction side, and a second surface 37, which faces the side opposite from the first surface 36. The optical element 33 has a reflective coating layer at the second surface 37. The first surface 36 has a concave shape. The second surface 37 has a convex shape. The optical element 33 has a first transmission surface 41, a reflection surface 42, and a second transmission surface 43 sequentially arranged from the reduction side toward the enlargement side. The first transmission surface 41 is provided at the first surface 36. The first transmission surface 41 has a concave shape. The reflection surface 42 is the reflective coating layer and has a concave shape to which the surface shape of the second surface 37 has been transferred. The reflection surface 42 reflects light within the optical element 33. The second transmission surface 43 is provided at the first surface 36. The second transmission surface 43 has a concave shape. The first transmission surface 41, the reflection surface 42, and the second transmission surface 43 are each an aspherical shape. The first transmission surface 41, the reflection surface 42, and the second transmission surface 43 are located at the lower side Y2 of the optical axis N, as shown in FIG. 12.

The first lens 34 is disposed between the lens L17 and the optical element 33 in the direction of the optical axis N and at the upper side Y1 of the optical axis N. The first lens 34 has negative power. The first lens 34 has a convex enlargement-side surface and a concave reduction-side surface. The first lens 34 has aspherical shapes at opposite sides.

A first region V1 and a second region V2 overlap with each other, as shown in FIG. 12. The first region V1 is a region as a result of projection of a luminous flux passage region of a reduction-side lens surface 34*a* of the first lens 34 onto the optical axis N, and the second region V2 is a region as a result of projection of a luminous flux passage region of the reflection surface 42 onto the optical axis N.

The liquid crystal panel 18 of the image formation unit 2 is disposed in the reduction-side conjugate plane of the projection system 3C. The screen S is disposed in the enlargement-side conjugate plane of the projection system 3C.

The liquid crystal panel 18 forms a projection image in an image formation plane perpendicular to the optical axis N of the first optical system 31. The liquid crystal panel 18 is disposed in a position offset from the optical axis N of the first optical system 31 toward the upper side Y1. The projection image is therefore formed in a position offset from the optical axis N toward the upper side Y1.

The beams from the liquid crystal panel 18 pass through the first optical system 31 and the second optical system 32 in the presented order. Between the first optical system 31 and the second optical system 32, the beams pass through the lower side Y2 of the optical axis N. The beams are thus incident on the first transmission surface 41 of the optical element 33, which forms the second optical system 32.

The beams having entered the optical element 33 via the first transmission surface 41 travel toward the reflection surface 42. The beams having reached the reflection surface 42 are deflected back in the first direction Z1 towards the upper side Y1. The beams having exited via the second transmission surface 43 cross the optical axis N toward the upper side Y1 and travels toward the first lens 34. The beams passing through the first lens 34 are widened by the first lens 34 and reach the screen S.

An intermediate image 30 is formed between the lens L17 and the reflection surface 42.

In the projection system 3C, the portion at the reduction side of the first optical system 31 is telecentric portion.

The projection system 3C has a changeable projection distance. When the projection distance is changed, the lenses L13 and L14 of the first optical system 31 are moved along the optical axis N for focusing.

Data on the projection system 3C are listed below,

LL 64.1 mm
MR 49.5 mm
imy 11.8 mm
scy 1473 mm
M 125
PD 168 mm
TR 0.114
NA 0.313
OL 17% where LL represents the largest radius of the first lens 34, MR represents the largest radius of the reflection surface 42, imy represents a first distance from the optical axis N to the largest image height at the liquid crystal panel 18, scy represents a second distance from the optical axis N to the largest image height of the enlarged image projected on the screen S, M represents a projection magnification that is the quotient of division of the second distance by the first distance, PD represents a projection distance that is the distance from the first lens 34 to the screen S, TR represents a throw ratio that is the quotient of division of the projection distance by the second distance, NA represents the numerical aperture of the liquid crystal panel 18, and OL represents an overlap ratio that is the quotient of division of the first region by the second region.

Data on the lenses of the projection system 3C are listed below. The surfaces of the lenses are numbered sequentially from the reduction side toward the enlargement side. Reference characters are given to the liquid crystal panel, the dichroic prism, the lenses, the optical element, the first lens, and the screen. Data labeled with a surface number that does not correspond to any of the liquid crystal panel, the dichroic prism, the lenses, the optical element, the first lens, and the screen is dummy data. Reference character R represents the radius of curvature. Reference character D represents the axial inter-surface spacing. Reference character C represents the aperture radius, and twice the aperture radius is the diameter of the lens surface. Reference characters R, D, and C are each expressed in millimeters.

The projection system 3C according to the present example has a changeable projection distance selected from a standard distance, a short distance shorter than the standard distance, and a long distance longer than the standard distance. When the projection distance is changed, the lenses L13 and L14 are each moved in the direction of the optical axis N for focusing.

The table below shows the variable spacings 1, 2, 3, and 4 at the projection distances where the focusing is performed. The variable spacing 1 is the axial inter-surface spacing between the lens L12 and the lens L13. The variable spacing 2 is the axial inter-surface spacing between the lens L13 and the lens L14. The variable spacing 3 is the axial inter-surface spacing between the lens L14 and the lens L15. The variable spacing 4 is the projection distance.

| Reference character | Surface number | Shape | R | D | Glass material | Refraction/ Reflection | C |
|---|---|---|---|---|---|---|---|
| 18 | 0 | Spherical | Infinity | 12.0000 | | Refraction | 0.0000 |
| | 1 | Spherical | Infinity | 0.0000 | | Refraction | 13.7172 |
| 19 | 2 | Spherical | Infinity | 31.0600 | SBSL7_OHARA | Refraction | 13.7172 |
| | 3 | Spherical | Infinity | 0.5000 | | Refraction | 16.9627 |
| L1 | 4 | Spherical | 34.7152 | 9.4162 | SFPL51_OHARA | Refraction | 17.8300 |
| | 5 | Spherical | −62.8985 | 1.9807 | | Refraction | 17.6406 |
| L2 | 6 | Spherical | 53.8953 | 11.5119 | SFPL51_OHARA | Refraction | 15.5000 |
| L3 | 7 | Spherical | −26.7189 | 1.2000 | SLAH55V_OHARA | Refraction | 14.3850 |
| | 8 | Spherical | 67.7890 | 0.2000 | | Refraction | 14.0665 |
| L4 | 9 | Spherical | 25.0001 | 7.4634 | SFPL51_OHARA | Refraction | 14.3732 |
| L5 | 10 | Spherical | −14757.3800 | 1.2000 | SLAH55V_OHARA | Refraction | 13.9801 |
| | 11 | Spherical | 60.7035 | 0.2000 | | Refraction | 13.7118 |
| L6 | 12 | Aspherical | 33.9317 | 4.5000 | LBAL35_OHARA | Refraction | 13.7221 |
| | 13 | Aspherical | −134.9471 | 0.1000 | | Refraction | 13.6184 |
| L7 | 14 | Spherical | 57.8598 | 7.7518 | SNSL36_OHARA | Refraction | 13.3475 |
| L8 | 15 | Spherical | −25.0000 | 2.0000 | SLAH55VS_OHARA | Refraction | 12.9314 |
| | 16 | Spherical | −31.5381 | 0.8640 | | Refraction | 12.8743 |
| L9 | 17 | Spherical | −78.6821 | 1.2000 | SLAH55V_OHARA | Refraction | 11.4257 |
| | 18 | Spherical | 31.1050 | 5.2958 | | Refraction | 10.7142 |
| 51 | 19 | Spherical | Infinity | 42.1388 | | Refraction | 10.6132 |
| | 20 | Spherical | Infinity | 0.2000 | | Refraction | 23.2444 |
| L10 | 21 | Spherical | 73.2019 | 9.4842 | EFD1_HOYA | Refraction | 24.7958 |
| | 22 | Spherical | −189.2361 | 0.2000 | | Refraction | 25.0000 |
| | 23 | Spherical | Infinity | 37.2164 | | Refraction | 25.0083 |
| L11 | 24 | Spherical | 50.4199 | 8.7405 | STIM2_OHARA | Refraction | 25.3000 |
| | 25 | Spherical | 621.3861 | 9.1274 | | Refraction | 24.6823 |
| L12 | 26 | Spherical | −40.2892 | 3.0000 | TAFD55W_HOYA | Refraction | 24.5989 |
| | 27 | Spherical | −364.7079 | Variable spacing 1 | | Refraction | 27.0602 |
| L13 | 28 | Aspherical | 39.8225 | 5.7565 | E48R_ZEON | Refraction | 33.0273 |
| | 29 | Aspherical | 35.6871 | Variable spacing 2 | | Refraction | 36.3201 |
| L14 | 30 | Aspherical | −35.4303 | 4.5000 | E48R_ZEON | Refraction | 37.7965 |
| | 31 | Aspherical | 54.9118 | Variable spacing 3 | | Refraction | 39.8685 |
| L15 | 32 | Spherical | 409.6120 | 20.0000 | SBSM14_OHARA | Refraction | 40.7633 |
| L16 | 33 | Spherical | −60.0000 | 3.0000 | EFDS1W_HOYA | Refraction | 40.7745 |
| | 34 | Spherical | −104.6127 | 30.9445 | | Refraction | 42.3072 |
| L17 | 35 | Aspherical | −168.6919 | 6.0000 | E48R_ZEON | Refraction | 39.4860 |
| | 36 | Aspherical | −141.4356 | 42.3866 | | Refraction | 39.8692 |
| 41 | 37 | Aspherical | −62.5238 | 9.5000 | E48R_ZEON | Refraction | 44.8638 |
| 42 | 38 | Aspherical | −44.1497 | −9.5000 | E48R_ZEON | Reflection | 47.9328 |
| 43 | 39 | Aspherical | −62.5238 | −42.3866 | | Refraction | 41.9244 |
| 34 | 40 | Aspherical | 54.0710 | −6.0000 | E48R_ZEON | Refraction | 52.3639 |
| | 41 | Aspherical | 135.5731 | 0.0000 | | Refraction | 64.3885 |
| | 42 | Spherical | Infinity | Variable spacing 4 | | Refraction | 320.1021 |
| S | 43 | Spherical | Infinity | 0.0000 | | Refraction | 2325.7596 |

| | | Standard distance | Short distance | Long distance |
|---|---|---|---|---|
| Variable spacing | 1 | 4.7921 | 1.5000 | 15.1106 |
| Variable spacing | 2 | 19.5776 | 22.7642 | 10.0000 |
| Variable spacing | 3 | 4.9915 | 5.0970 | 3.2512 |
| Variable spacing | 4 | −168.0000 | −152.2525 | −286.8933 |

The aspherical coefficients are listed below.

| Surface number | S12 | S13 | S28 | S29 |
|---|---|---|---|---|
| Radius of curvature (R) | 33.9317 | −134.9471 | 39.8225 | 35.6871 |
| Conic constant (K) | −1.91488E+00 | 5.29125E+00 | 0 | −1.519076235 |
| Fourth-order | −1.36083E−05 | 6.07214E−06 | −1.78027E−05 | −1.70470E−05 |
| Sixth-order | −2.36845E−08 | −1.83910E−08 | 3.67433E−09 | 7.80702E−09 |
| Eighth-order | −8.21413E−11 | −2.33402E−11 | −4.29777E−12 | −2.91996E−12 |
| Tenth-order | 3.81369E−13 | 3.26482E−13 | 3.10285E−15 | 5.78482E−16 |
| Twelfth-order | | | −1.04151E−18 | |

| Surface number | S30 | S31 | S35 | S36 |
|---|---|---|---|---|
| Radius of curvature (R) | −35.4303 | 54.9118 | −168.6919 | −141.4356 |
| Conic constant (K) | −0.349123834 | −27.12785108 | 0 | 0.00000E+00 |
| Fourth-order | 1.03122E−05 | −1.06456E−05 | 1.02713E−06 | −1.67537E−07 |
| Sixth-order | 1.63690E−09 | 8.28855E−09 | −1.86783E−10 | 4.01405E−10 |
| Eighth-order | −4.92720E−12 | −5.33059E−12 | 3.12588E−14 | 1.04096E−13 |
| Tenth-order | 2.39811E−15 | 1.60459E−15 | 6.28338E−17 | 3.43985E−17 |
| Twelfth-order | 8.64974E−19 | 3.15854E−19 | | |
| Fourteenth-order | −1.20770E−21 | −4.11577E−22 | | |
| Sixteenth-order | 3.44046E−25 | 8.17257E−26 | | |

| Surface number | S37 | S38 | S39 |
|---|---|---|---|
| Radius of curvature (R) | −62.5238 | −44.1497 | −62.52380168 |
| Conic constant (K) | −5.59655E−01 | −6.80365E−01 | −0.559655288 |
| Fourth-order | −6.36282E−07 | 2.20181E−06 | −6.36282E−07 |
| Sixth-order | −9.06977E−10 | −1.69823E−09 | −9.06977E−10 |
| Eighth-order | 8.38639E−13 | 9.66601E−13 | 8.38639E−13 |
| Tenth-order | −2.33588E−16 | −3.27157E−16 | −2.33588E−16 |
| Twelfth-order | | 7.91655E−20 | |
| Fourteenth-order | | −1.65069E−23 | |
| Sixteenth-order | | 1.87002E−27 | |

| Surface number | S40 | S41 |
|---|---|---|
| Radius of curvature (R) | 54.07103555 | 135.5730803 |
| Conic constant (K) | −0.682127347 | −10 |
| Fourth-order | 8.47829E−07 | 2.14102E−06 |
| Sixth-order | 4.63957E−10 | −5.31612E−10 |
| Eighth-order | −2.39127E−13 | 1.54943E−13 |
| Tenth-order | 2.76459E−17 | −2.38642E−17 |
| Twelfth-order | −1.35352E−21 | 1.96750E−21 |

The projection system 3C according to the present example satisfies Conditional Expressions (1) and (2) below, $$3.5 \leq (LL+MR)/imy \times TR \times (1/NA) \leq 6.0 \quad (1)$$

$$TR \leq 0.2 \quad (2)$$

where LL represents the largest radius of the first lens 34, MR represents the largest radius of the reflection surface 42, imy represents a first distance from the optical axis N to the largest image height at the liquid crystal panel 18, TR represents a throw ratio that is the quotient of division of the projection distance by a second distance from the optical axis N to the largest image height of the enlarged image at the screen S, and NA represents the numerical aperture of the liquid crystal panel 18.

In the present example, the values described above are listed below.

LL 64.1 mm

MR 49.5 mm imy 11.8 mm

TR 0.114

NA 0.313

(LL+MR)/imy×TR×(1/NA)=3.51 is therefore satisfied, whereby Conditional Expression (1) is satisfied. Since TR=0.114, Conditional Expression (2) is satisfied.

The overlap ratio OL, which is the quotient of division of the first region V1 by the second region V2, is greater than or equal to 108. That is, the first region V1 overlaps with the second region V2 by an amount greater than or equal to 10%. In the present example, the overlap ratio OL is 17%, so that the first region V1 overlaps with the second region V2 by 17%.

Effects and Advantages

In the projection system 3C according to the present example, the first optical system 31 includes the three lenses L13, L14, and L17 (aspherical lenses), which are located at the enlargement side of the diaphragm 51 and each have an aspherical shape. The projection system 3C can therefore correct distortion and image curvature on an image height basis.

The lenses L13 and L14 are each moved in the direction of the optical axis N during focusing. Since the lenses L13 and L14, which correct a variety of aberrations on an image height basis, are moved in the direction of the optical axis N, occurrence of the variety of aberrations during focusing can be suppressed.

The first optical system 31 further includes the cemented doublet L24 at the enlargement side of the diaphragm 51. The chromatic aberrations can therefore be corrected well.

The projection system 3C according to the present example satisfies Conditional Expression (3) below, $$0.3 \leq NR \quad (3)$$

where NA represents the numerical aperture of the liquid crystal panel 18.

The projection system 3C according to the present example, in which NA=0.313, satisfies Conditional Expression (3). A bright projection system can therefore be achieved.

In the projection system 3C according to the present example, the first region V1 and the second region V2 overlap with each other. The first region V1 is a region as a result of projection of the luminous flux passage region of the reduction-side lens surface 34*a* of the first lens 34 onto the optical axis N, and the second region V2 is a region as a result of projection of the luminous flux passage region of the reflection surface 42 onto the optical axis N. Therefore, even when the distance between the first lens 34 and the reflection surface 42 is shortened, but when the first region V1 and the second region V2 overlap with each other, the first lens 34 is likely to capture the high-image-height luminous flux formed of the beams reflected off the reflection surface 42. As a result, the projection system 3C according to the present example allows suppression of an increase in the lens diameter of the first lens 34 and reduction in the focal length of the projection system.

In the projection system 3C according to the present example, the first region V1 overlaps with the second region V2 by 17%. Ensuring that the amount of overlap is greater than or equal to 10% therefore ensures that the amount of light contained in the peripheral luminous flux is about 40%. The projection system 3C can therefore project an entirely bright enlarged image having a bright periphery.

Figure 13:
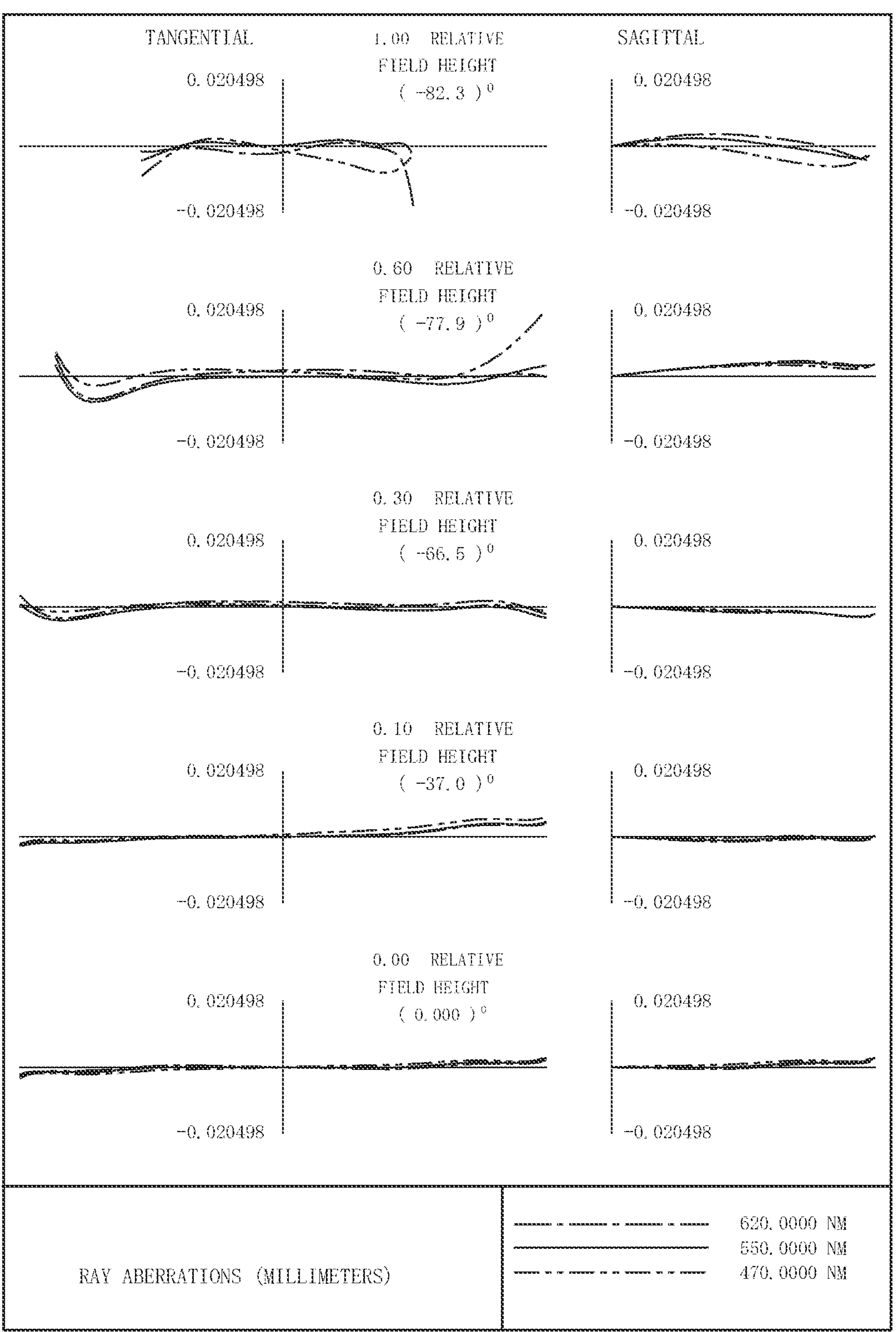
FIG. 13 shows the lateral aberrations produced by the projection system according to Example 3 set at the standard distance.
Figure 14:
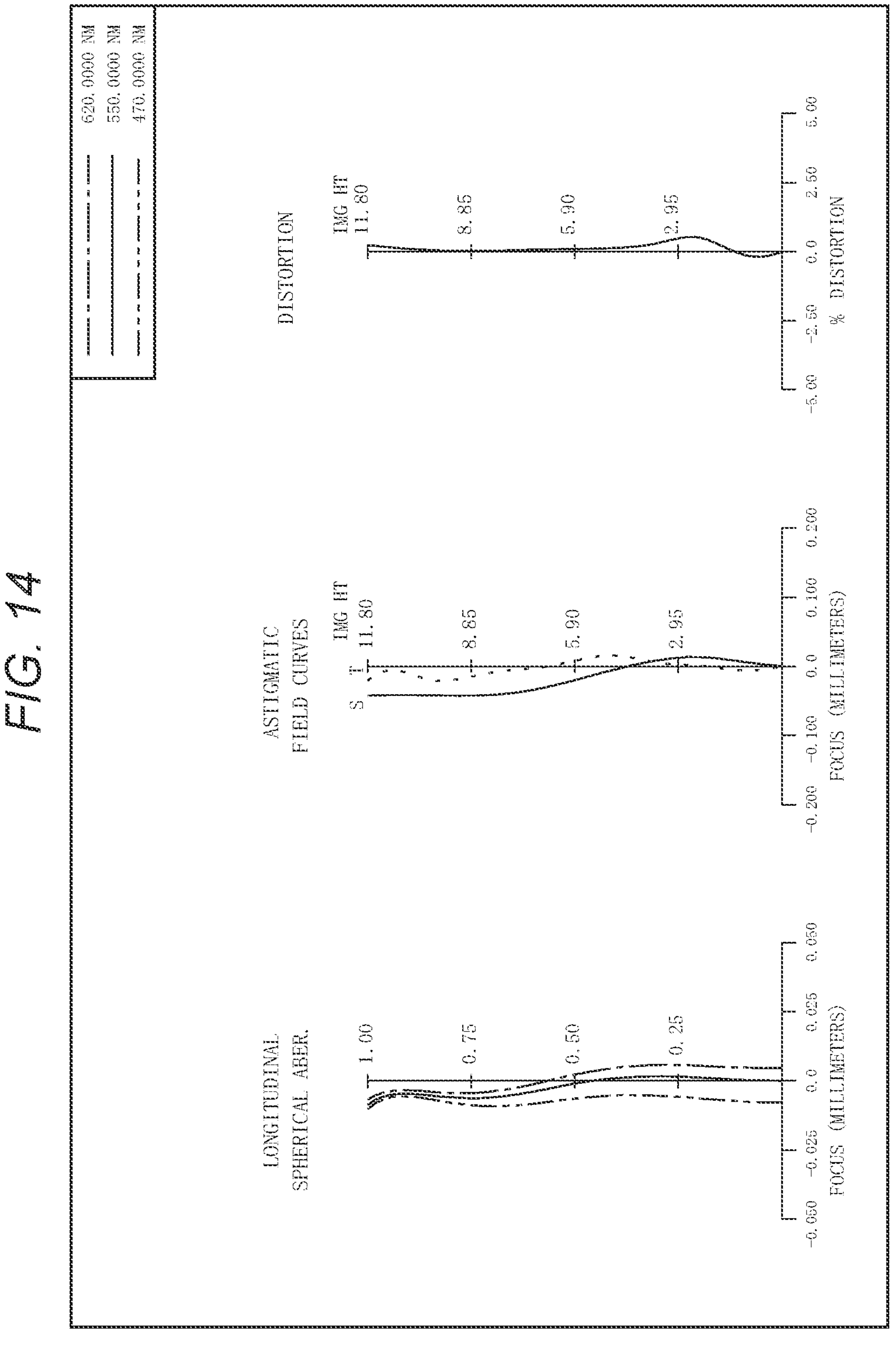
FIG. 14 shows the spherical aberration, astigmatism, and distortion produced by the projection system according to Example 3 set at the standard distance.
Figure 15:
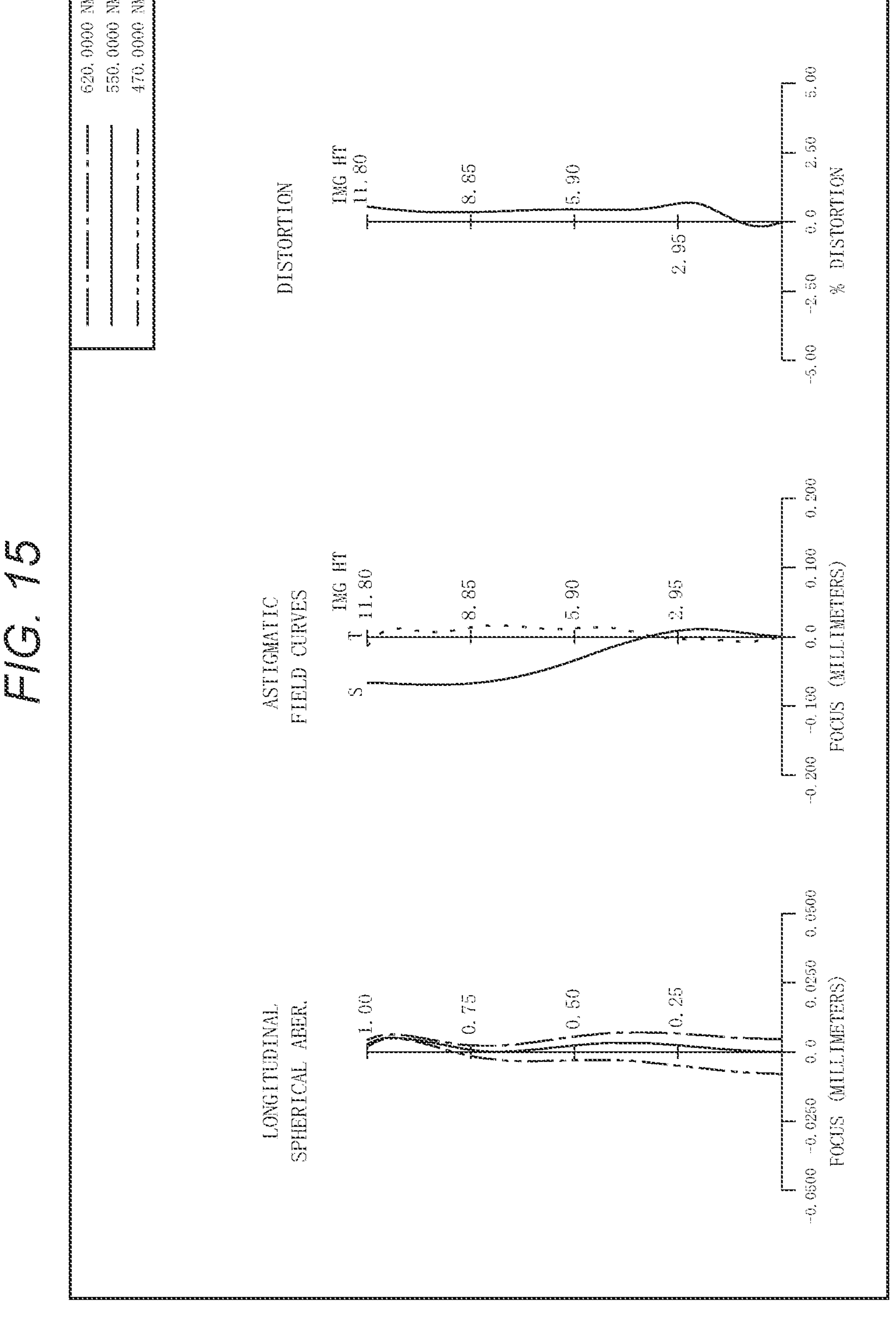
FIG. 15 shows the spherical aberration, astigmatism, and distortion produced by the projection system according to Example 3 set at the short distance.
Figure 16:
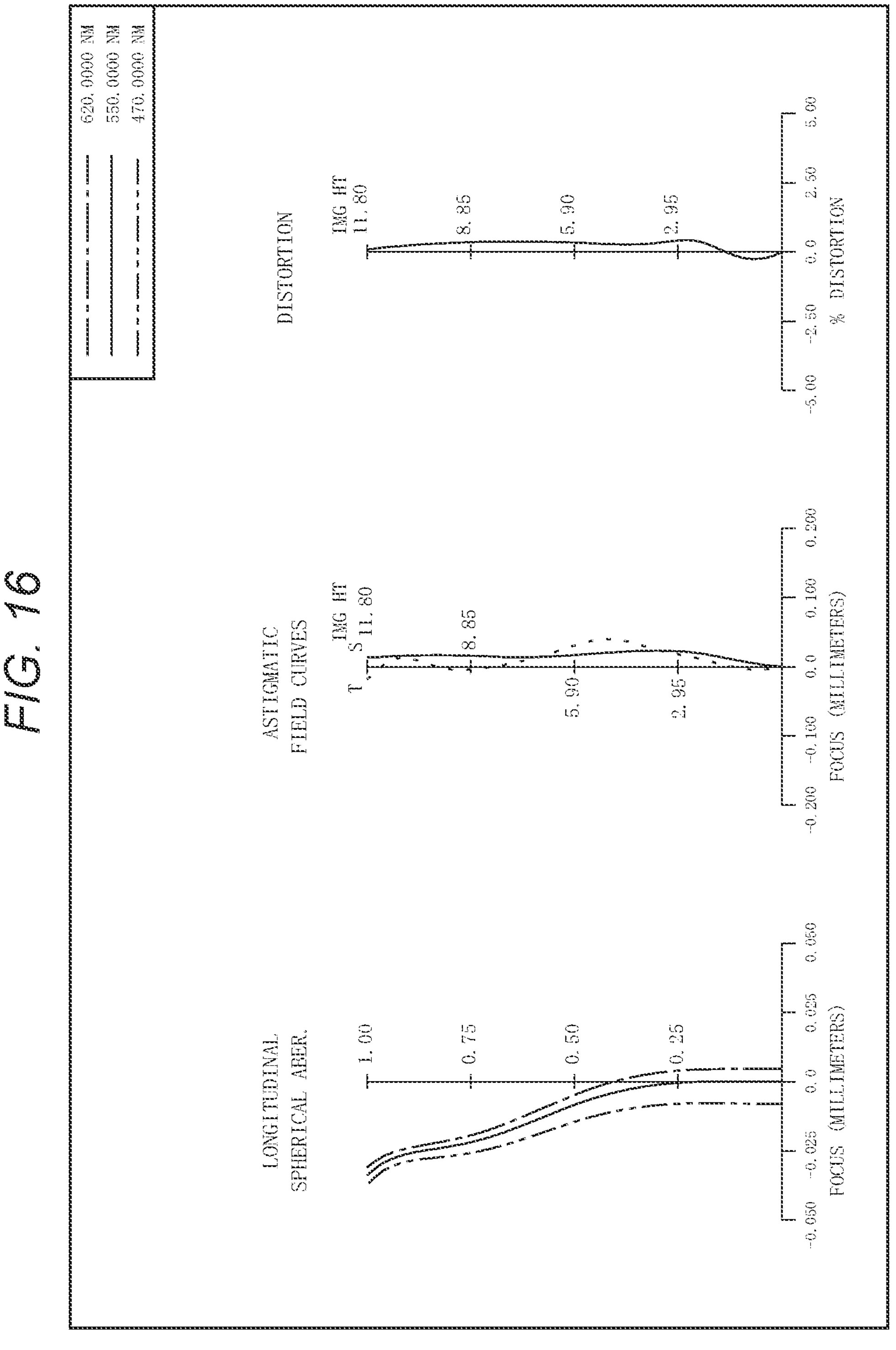
FIG. 16 shows the spherical aberration, astigmatism, and distortion produced by the projection system according to Example 3 set at the long distance.

The projection system 3C according to the present example, which satisfies Conditional Expressions (1) and (2), can provide the same effects and advantages as those provided by the projection system 3A according to Example 1. FIG. 13 shows the lateral aberrations produced by the projection system 3C set at the standard distance. FIG. 14 shows the spherical aberration, astigmatism, and distortion produced by the projection system 3C set at the standard distance. FIG. 15 shows the spherical aberration, astigmatism, and distortion produced by the projection system 3C set at the short distance. FIG. 16 shows the by the projection system 3C set at the long distance. The projection system 3C according to the present example produces an enlarged image having suppressed aberrations, as shown in FIGS. 13 to 16.

Example 4

Figure 17:
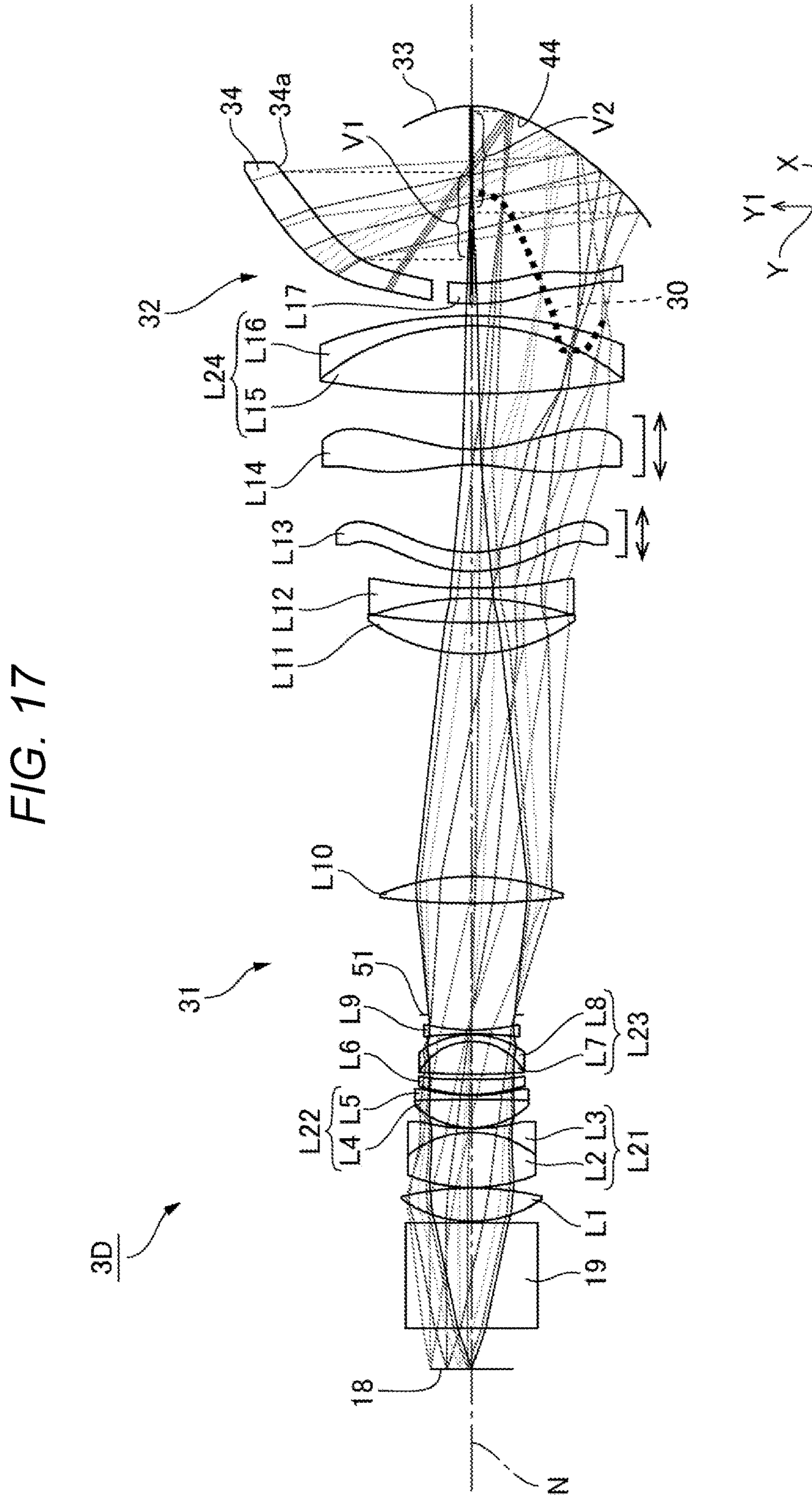
FIG. 17 is a beam diagram showing beams passing through the projection system according to Example 4.

FIG. 17 is a beam diagram showing beams passing through a projection system 3D according to Example 4. The projection system 3D according to the present example is formed of a first optical system 31 and a second optical system 32 sequentially arranged from the reduction side toward the enlargement side, as shown in FIG. 17. The second optical system 32 is disposed on an optical axis N of the first optical system 31.

The first optical system 31 is a refractive optical system. The first optical system 31 is formed of seventeen lenses L1 to L17. The lenses L1 to L17 are arranged in the presented order from the reduction side toward the enlargement side. A diaphragm 51 is disposed between the lens L9 and the lens L10.

The lens L6 has aspherical shapes at opposite sides. The lens L13 has aspherical shapes at opposite sides. The lens L14 has aspherical shapes at opposite sides. The lens L17 has aspherical shapes at opposite sides. The lens L2 and the lens L3 are bonded to each other into a cemented doublet L21. The lens L4 and the lens L5 are bonded to each other into a cemented doublet L22. The lens L7 and the lens L8 are bonded to each other into a cemented doublet L23. The lens L15 and the lens L16 are bonded to each other into a cemented doublet L24.

The second optical system 32 includes an optical element 33 and a first lens 34. The optical element 33 and the first lens 34 are arranged in the presented order from the reduction side toward the enlargement side. The optical element 33 has a reflection surface 44, which faces the reduction side. The reflection surface 44 has a concave shape recessed in the second direction Z2. The reflection surface 44 has an aspherical shape. The reflection surface 44 is located at the lower side Y2 of the optical axis N, as shown in FIG. 17. The reflection surface 44 is formed by providing the outer surface, in the first direction Z1, of the optical element 33 with a reflection coating layer (reflection layer). The reflection surface 44 reflects light at the surface, facing in the direction Z1, of the optical element 33.

The first lens 34 is disposed between the lens L17 and the optical element 33 and at the upper side Y1 of the optical axis N. The first lens 34 has negative power. The first lens 34 has a convex enlargement-side surface and a concave reduction-side surface. The first lens 34 has aspherical shapes at opposite sides.

A first region V1 and a second region V2 overlap with each other, as shown in FIG. 17. The first region V1 is a region as a result of projection of a luminous flux passage region of a reduction-side lens surface 34*a* of the first lens 34 onto the optical axis N, and the second region V2 is a region as a result of projection of a luminous flux passage region of the reflection surface 44 onto the optical axis N.

The liquid crystal panel 18 of the image formation unit 2 is disposed in the reduction-side conjugate plane of the projection system 3D. The screen S is disposed in the enlargement-side conjugate plane of the projection system 3D.

The liquid crystal panel 18 forms a projection image in an image formation plane perpendicular to the optical axis N of the first optical system 31. The liquid crystal panel 18 is disposed in a position offset from the optical axis N of the first optical system 31 toward the upper side Y1. The projection image is therefore formed in a position offset from the optical axis N toward the upper side Y1.

The beams from the liquid crystal panel 18 pass through the first optical system 31 and the second optical system 32 in the presented order. Between the first optical system 31 and the second optical system 32, the beams pass through the lower side Y2 of the optical axis N. The beams are therefore directed through the second optical system 32 toward the reflection surface 44. The T beams having reached the reflection surface 44 are deflected back in the first direction Z1 towards the upper side Y1. The beams deflected back by the reflection surface 44 cross the optical axis N toward the upper side Y1 and travel toward the first lens 34. The beams passing through the first lens 34 are widened by the first lens 34 and reach the screen S.

An intermediate image 30 is formed between the cemented doublet L24 and the reflection surface 44.

In the projection system 3D, the portion at the reduction side of the first optical system 31 is a telecentric portion.

The projection system 3D has a changeable projection distance. When the projection distance is changed, the lenses L13 and L14 of the first optical system 31 are moved along the optical axis N for focusing.

Data on the projection system 3D are listed below,

LL 64.0 mm
49.5 mm MR
imy 11.8 mm
scy 1475 mm
M 125
PD 168 mm
TR 0.114
NA 0.313
OL 35% where LL represents the largest radius of the first lens 34, MR represents the largest radius of the reflection surface 44, imy represents a first distance from the optical axis N to the largest image height at the liquid crystal panel 18, scy represents a second distance from the optical axis N to the largest image height of the enlarged image projected on the screen S, M represents a projection magnification that is the quotient of division of the second distance by the first distance, PD represents a projection distance that is the distance from the first lens 34 to the screen S, TR represents a throw ratio that is the quotient of division of the projection distance by the second distance, NA represents the numerical aperture of the liquid crystal panel 18, and OL represents an overlap ratio that is the quotient of division of the first region by the second region.

Data on the lenses of the projection system 3D are listed below. The surfaces of the lenses are numbered sequentially from the reduction side toward the enlargement side. Reference characters are given to the liquid crystal the first lens, and the screen. Data labeled with a surface number that does not correspond to any of the liquid crystal panel, the dichroic prism, the lenses, the optical element, the first lens, and the screen is dummy data. Reference character R represents the radius of curvature. Reference character D represents the axial inter-surface spacing. Reference character C represents the aperture radius, and twice the aperture radius is the diameter of the lens surface. Reference characters R, D, and C are each expressed in millimeters.

| Reference character | Surface number | Shape | R | D | Glass material | Refraction/ Reflection | C |
|---|---|---|---|---|---|---|---|
| 18 | 0 | Spherical | Infinity | 12.0000 | | Refraction | 0.0000 |
| | 1 | Spherical | Infinity | 0.0000 | | Refraction | 13.9867 |
| 19 | 2 | Spherical | Infinity | 31.0600 | SBSL7_OHARA | Refraction | 13.9867 |
| | 3 | Spherical | Infinity | 0.5000 | | Refraction | 17.6806 |
| L1 | 4 | Spherical | 35.0456 | 9.5857 | SFPL51_OHARA | Refraction | 18.7643 |
| | 5 | Spherical | −82.3845 | 0.1500 | | Refraction | 18.5713 |
| L2 | 6 | Spherical | 47.1041 | 16.2301 | SFPL51_OHARA | Refraction | 17.0701 |
| L3 | 7 | Spherical | −28.2620 | 1.2000 | SLAH55V_OHARA | Refraction | 15.0541 |
| | 8 | Spherical | 56.2828 | 0.2000 | | Refraction | 14.6397 |
| L4 | 9 | Spherical | 23.5101 | 8.3358 | SFPL51_OHARA | Refraction | 15.1168 |
| L5 | 10 | Spherical | −561.8839 | 1.2000 | SLAH55V_OHARA | Refraction | 14.6188 |
| | 11 | Spherical | 55.1573 | 0.2000 | | Refraction | 14.1414 |
| L6 | 12 | Aspherical | 35.6099 | 4.5000 | LBAL35_OHARA | Refraction | 14.1105 |
| | 13 | Aspherical | 790.1163 | 1.5424 | | Refraction | 13.7143 |
| L7 | 14 | Spherical | 190.2717 | 9.6606 | SNSL36_OHARA | Refraction | 13.5858 |
| L8 | 15 | Spherical | −17.0613 | 2.0000 | SLAH55VS_OHARA | Refraction | 13.3512 |
| | 16 | Spherical | −24.2849 | 0.1500 | | Refraction | 13.9214 |

-continued

| Reference character | Surface number | Shape | R | D | Glass material | Refraction/ Reflection | C |
|---|---|---|---|---|---|---|---|
| L9 | 17 | Spherical | −115.1313 | 1.2000 | SLAH55V_OHARA | Refraction | 12.6057 |
| | 18 | Spherical | 50.8279 | 4.5588 | | Refraction | 12.2520 |
| 51 | 19 | Spherical | Infinity | 32.5756 | | Refraction | 12.2983 |
| | 20 | Spherical | Infinity | 0.2000 | | Refraction | 22.2074 |
| L10 | 21 | Spherical | 206.4084 | 7.8594 | 661899.3094 | Refraction | 22.6473 |
| | 22 | Spherical | −70.0227 | 0.2000 | | Refraction | 24.7405 |
| | 23 | Spherical | Infinity | 65.2509 | | Refraction | 22.9486 |
| L11 | 24 | Spherical | 49.3229 | 9.2057 | 698675.5141 | Refraction | 27.9940 |
| | 25 | Spherical | 171.7382 | 7.1627 | | Refraction | 27.3923 |
| L12 | 26 | Spherical | −85.6703 | 3.0000 | TAFD55W_HOYA | Refraction | 27.7075 |
| | 27 | Spherical | 146.2723 | Variable spacing 1 | | | |
| L13 | 28 | Aspherical | 37.0939 | 5.6058 | E48R_ZEON | Refraction | 34.8196 |
| | 29 | Aspherical | 36.2920 | Variable spacing 2 | | Refraction | 37.0315 |
| L14 | 30 | Aspherical | −42.6206 | 4.5000 | E48R_ZEON | Refraction | 38.9990 |
| | 31 | Aspherical | 43.2026 | Variable spacing 3 | | Refraction | 41.0194 |
| | 32 | Spherical | 254.5013 | 20.0000 | 607793.6094 | Refraction | 41.0822 |
| L15 | 33 | Spherical | −68.0557 | 3.0000 | EFDS1W_HOYA | Refraction | 40.9056 |
| L16 | 34 | Spherical | −114.0162 | 3.5287 | | Refraction | 41.5719 |
| | 35 | Aspherical | 71.9288 | 6.0000 | E48R_ZEON | Refraction | 40.5582 |
| L17 | 36 | Aspherical | 54.9756 | 42.5784 | | Refraction | 41.3090 |
| | 37 | Spherical | Infinity | 9.5000 | | Refraction | 61.3553 |
| 44 | 38 | Aspherical | −27.4464 | −9.5000 | | Reflection | 49.2811 |
| | 39 | Spherical | Infinity | −42.5784 | | Refraction | 186.8037 |
| | 40 | Aspherical | 99.9351 | −6.0000 | E48R_ZEON | Refraction | 56.8531 |
| 34 | 41 | Aspherical | 59.8152 | 0.0000 | | Refraction | 65.2610 |
| | 42 | Spherical | Infinity | Variable spacing 4 | | Refraction | 331.4336 |
| | 43 | Spherical | Infinity | 0.0000 | | Refraction | 2322.5115 |
| S | 44 | Spherical | Infinity | 0.0000 | | Refraction | 2325.7596 |

The projection system 3D according to the present example has a changeable projection distance selected from a standard distance, a short distance shorter than the standard distance, and a long distance longer than the standard distance. When the projection distance is changed, the lenses L13 and L14 are each moved in the direction of the optical axis N for focusing.

The table below shows the variable spacings 1, 2, 3, and 4 at the projection distances where the focusing is performed. The variable spacing 1 is the axial inter-surface spacing between the lens L12 and the lens L13. The variable spacing 2 is the axial inter-surface spacing between the lens L13 and the lens L14. The variable spacing 3 is the axial inter-surface spacing between the lens L14 and the lens L15. The variable spacing 4 is the projection distance.

| | | Standard distance | Short distance | Long distance |
|---|---|---|---|---|
| Variable spacing | 1 | 4.9848 | 1.5000 | 18.0158 |
| Variable spacing | 2 | 25.8203 | 28.7472 | 14.7861 |
| Variable spacing | 3 | 16.3634 | 16.9264 | 14.3448 |
| Variable spacing | 4 | −168.0000 | −150.2128 | −293.3796 |

The aspherical coefficients are listed below.

| Surface number | S12 | S13 | S28 | S29 |
|---|---|---|---|---|
| Radius of curvature (R) | 35.6099 | 790.1163 | 37.0939 | 36.2920 |
| Conic constant (K) | −1.21463E+00 | 0.00000E+00 | 0 | −0.413891498 |
| Fourth-order | −1.31545E−05 | 1.34858E−05 | −4.08775E−06 | −3.40633E−06 |
| Sixth-order | −7.44286E−09 | −7.13228E−10 | 1.30257E−09 | 1.64757E−09 |
| Eighth-order | −1.21820E−10 | −8.89705E−11 | −1.60174E−11 | −1.41391E−11 |
| Tenth-order | 7.96558E−13 | 7.11611E−13 | 2.18790E−14 | 3.21657E−15 |
| Twelfth-order | | | −2.9222E−17 | 4.1512E−17 |
| Fourteenth-order | | | 4.94534E−20 | −8.00873E−20 |
| Sixteenth-order | | | −6.28829E−23 | 6.8147E−23 |
| Eighteenth-order | | | 4.12923E−26 | −2.8436E−26 |
| Twentieth-order | | | −1.06684E−29 | 4.70997E−30 |

-continued

| Surface number | S30 | S31 | S35 | S36 |
|---|---|---|---|---|
| Radius of curvature (R) | −42.6206 | 43.2026 | 71.9288 | 54.9756 |
| Conic constant (K) | 0.056965865 | −4.135304852 | 0 | 0.00000E+00 |
| Fourth-order | 3.08878E−05 | −1.68823E−06 | 2.21193E−05 | 7.21985E−06 |
| Sixth-order | −6.88752E−08 | −6.69053E−09 | −7.37617E−08 | −4.57465E−08 |
| Eighth-order | 1.58520E−10 | 1.32432E−12 | 8.84237E−11 | 5.00113E−11 |
| Tenth-order | −2.50117E−13 | 4.57917E−14 | −5.20462E−14 | −2.12167E−14 |
| Twelfth-order | 2.60405E−16 | −1.09411E−16 | 1.44343E−17 | 1.94322E−18 |
| Fourteenth-order | −1.80118E−19 | 1.17978E−19 | −9.15753E−22 | 1.04026E−21 |
| Sixteenth-order | 8.19251E−23 | −6.81458E−23 | −2.66625E−25 | −2.31410E−25 |
| Eighteenth-order | −2.27082E−26 | 2.04969E−26 | | |
| Twentieth-order | 2.94511E−30 | −2.52975E−30 | | |

| Surface number | S38 | S40 | S41 |
|---|---|---|---|
| Radius of curvature (R) | −27.4464 | 99.9351 | 59.81524269 |
| Conic constant (K) | −8.41006E−01 | 1.05301E+00 | −13.8159847 |
| Fourth-order | 1.28662E−05 | 1.77683E−05 | 5.07345E−06 |
| Sixth-order | −2.58290E−08 | −5.97124E−08 | −1.55689E−08 |
| Eighth-order | 3.96010E−11 | 9.10924E−11 | 2.02144E−11 |
| Tenth-order | −3.82664E−14 | −7.57697E−14 | −1.40903E−14 |
| Twelfth-order | 2.39667E−17 | 3.85237E−17 | 6.14695E−18 |
| Fourteenth-order | −9.77579E−21 | −1.24207E−20 | −1.74666E−21 |
| Sixteenth-order | 2.51330E−24 | 2.49179E−24 | 3.16103E−25 |
| Eighteenth-order | −3.70566E−28 | −2.85104E−28 | −3.31720E−29 |
| Twentieth-order | 2.38895E−32 | 1.42848E−32 | 1.53534E−33 |

The projection system 3D according to the present example satisfies Conditional Expressions (1) and (2) below, $$3.5 \leq *(LL + Mr)/imy \times TR \times (1/NA) \leq 6.0 \tag{1}$$

$$TR \leq 0.2 \tag{2}$$

where LL represents the largest radius of the first lens 34, MR represents the largest radius of the reflection surface 44, imy represents the first distance from the optical axis N to the largest image height at the liquid crystal panel 18, TR represents the throw ratio that is the quotient of division of the projection distance by the second distance from the optical axis N to the largest image height of the enlarged image at the screen S, and NA represents the numerical aperture of the liquid crystal panel 18.

In the present example, the values described above are listed below.

LL 64.0 mm

MR 49.5 mm imy 11.8 mm

TR 0.114

NA 0.313

(LL+MR)/imy×TR×(1/NA)=3.50 is therefore satisfied, whereby Conditional Expression (1) is satisfied. Since TR=0.114, Conditional Expression (2) is satisfied.

The overlap ratio OL, which is the quotient of division of the first region V1 by the second region V2, is greater than or equal to 10%. That is, the first region V1 overlaps with the second region V2 by an amount greater than or equal to 108. In the present example, the overlap ratio OL is 35%, so that the first region V1 overlaps with the second region V2 by 35%.

Effects and Advantages

In the projection system 3D according to the present example, the first optical system 31 includes the three lenses L13, L14, and L17 (aspherical lenses), which are located at the enlargement side of the diaphragm 51 and each have an aspherical shape. The projection system 3D can therefore correct distortion and image curvature on an image height basis.

The lenses L13 and L14 are each moved in the direction of the optical axis N during focusing. Since the lenses L13 and L14, which correct a variety of aberrations on an image height basis, are moved in the direction of the optical axis N, occurrence of the variety of aberrations during focusing can be suppressed.

The first optical system 31 further includes the cemented doublet L24 at the enlargement side of the diaphragm 51. The chromatic aberrations can therefore be corrected well.

The projection system 3D according to the present example satisfies Conditional Expression (3) below, $$0.3 \leq NR \tag{3}$$

where NA represents the numerical aperture of the liquid crystal panel 18.

The projection system 3D according to the present example, in which NA=0.313, satisfies Conditional Expression (3). A bright projection system can therefore be achieved.

In the projection system 3D according to the present example, the reflection surface 44 is provided with a reflection coating layer (reflection layer). The accuracy of the shape of the reflection surface 44 in the present example is therefore readily improved as compared with that of the reflection surface 42 in Example 1. Furthermore, in the projection system 3D according to the present example, the support film layer is provided on the side opposite from the reflection coating layer, whereby the optical performance of the reflection surface 44 is not likely to deteriorate. Stable optical performance of the reflection surface 44 is therefore likely to be achieved during the manufacture of the optical element 33.

In the projection system 3D according to the present example, the first region V1 and the second region V2 overlap with each other. The first region V1 is a region as a result of projection of the luminous flux passage region of the reduction-side lens surface 34a of the first lens 34 onto the optical axis N, and the second region V2 is a region as a result of projection of the luminous flux passage region of the reflection surface 44 onto the optical axis N. Therefore, even when the distance between the first lens 34 and the reflection surface 44 is shortened, but when the first region V1 and the second region V2 overlap with each other, the first lens 34 is likely to capture the high-image-height luminous flux formed of the beams reflected off the reflection surface 44. As a result, the projection system 3D according to the present example allows suppression of an increase in the lens diameter of the first lens 34 and reduction in the focal length of the projection system.

In the projection system 3D according to the present example, the first region V1 overlaps with the second region V2 by 35%. Ensuring that the amount of overlap is greater than or equal to 10% therefore ensures that the amount of light contained in the peripheral luminous flux is about 40%. The projection system 3D can therefore project an entirely bright enlarged image having a bright periphery.

Figure 18:
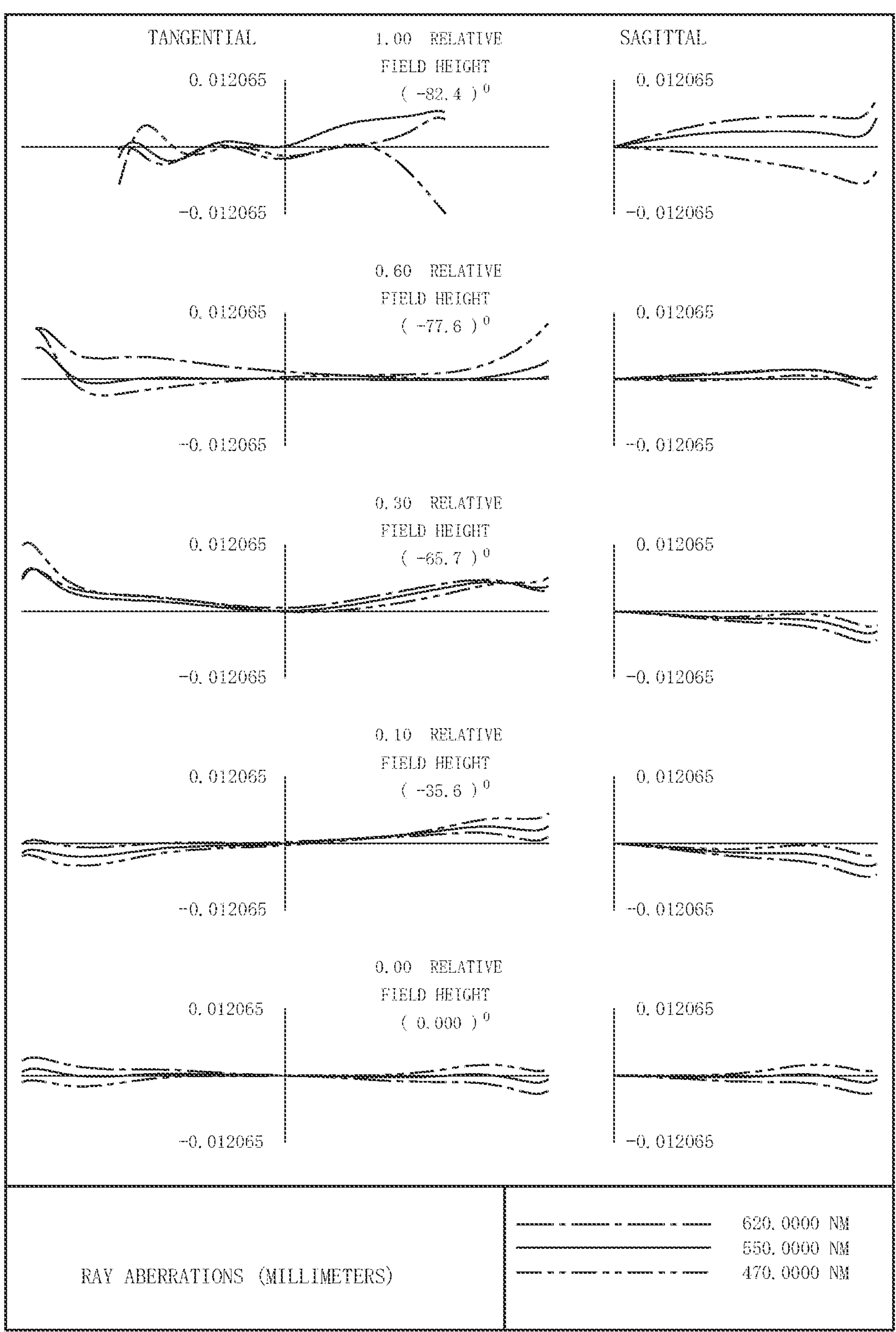
FIG. 18 shows the lateral aberrations produced by the projection system according to Example 4 set at the standard distance.
Figure 19:
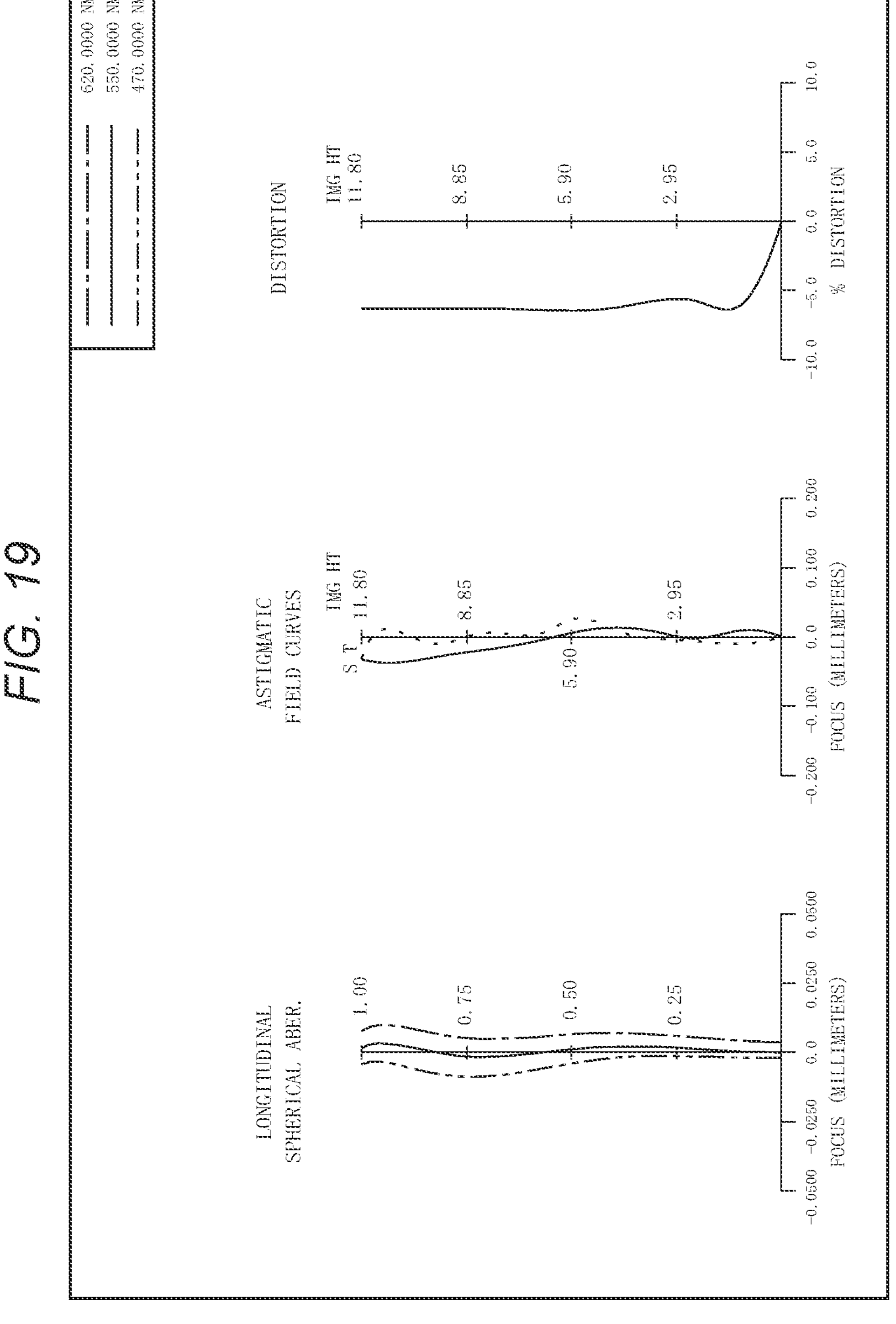
FIG. 19 shows the spherical aberration, astigmatism, and distortion produced by the projection system according to Example 4 set at the standard distance.
Figure 20:
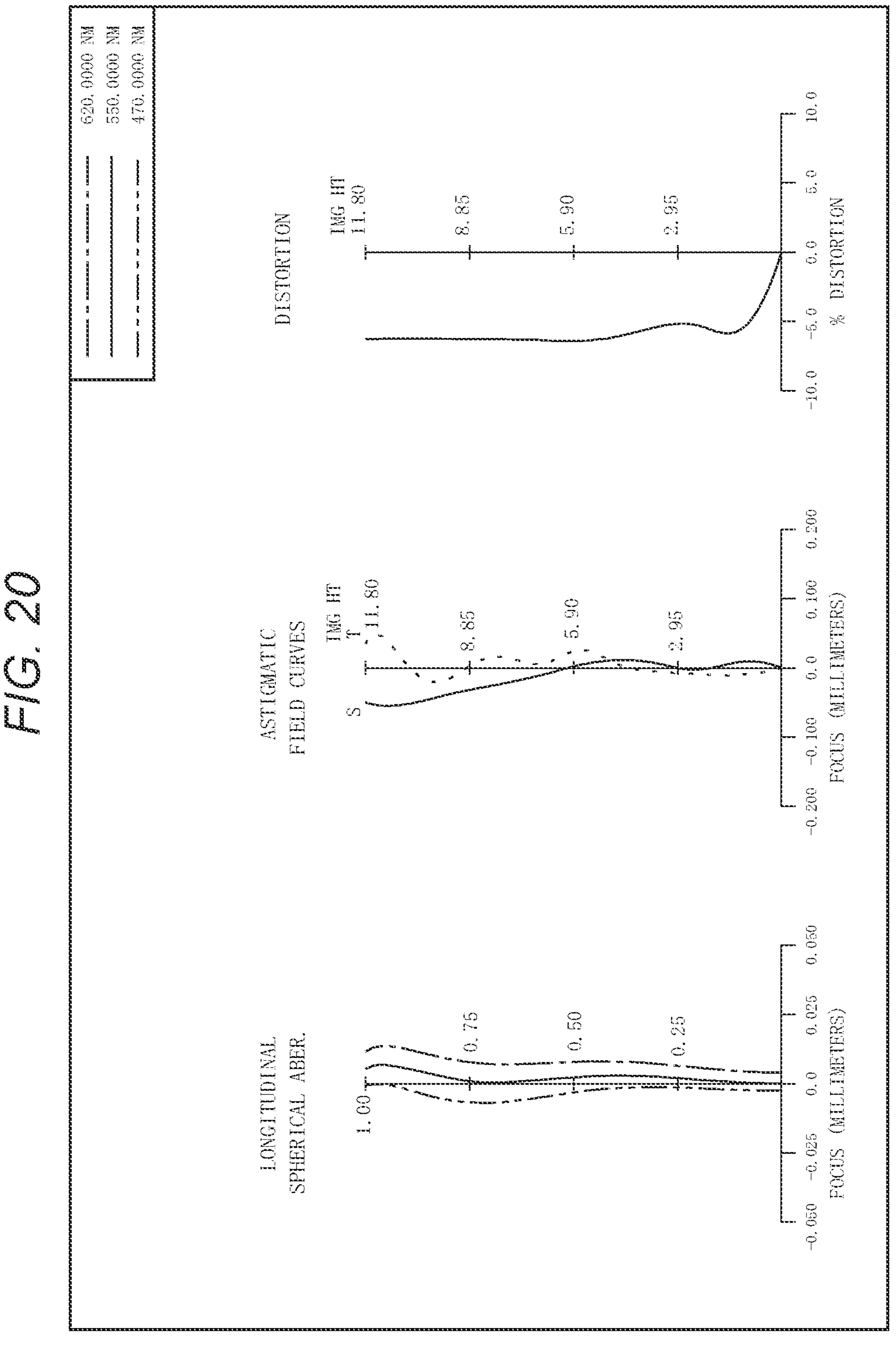
FIG. 20 shows the spherical aberration, astigmatism, and distortion produced by the projection system according to Example 4 set at the short distance.
Figure 21:
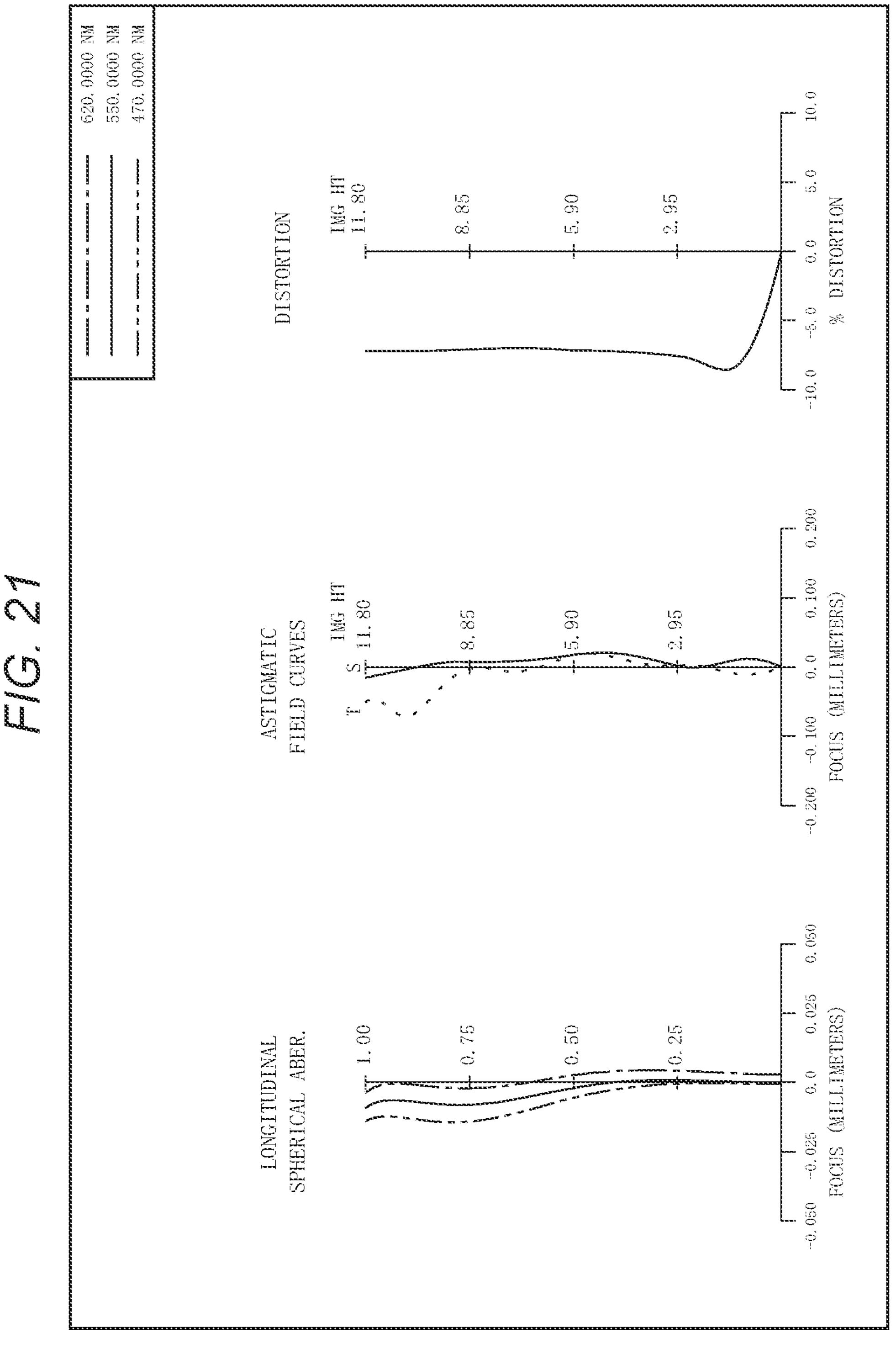
FIG. 21 shows the spherical aberration, astigmatism, and distortion produced by the projection system according to Example 4 set at the long distance.

The projection system 3D according to the present example, which satisfies Conditional Expressions (1) and (2), can provide the same effects and advantages as those provided by the projection system 3A according to Example 1. FIG. 18 shows the lateral aberrations produced by the projection system 3D set at the standard distance. FIG. 19 shows the spherical aberration, astigmatism, and distortion produced by the projection system 3D set at the standard distance. FIG. 20 shows the spherical aberration, astigmatism, and distortion produced by the projection system 3D set at the short distance. FIG. 21 shows the spherical aberration, astigmatism, and distortion produced by the projection system 3D set at the long distance. The projection system 3D according to the present example produces an enlarged image having suppressed aberrations, as shown in FIGS. 18 to 21.

Example 5

Figure 22:
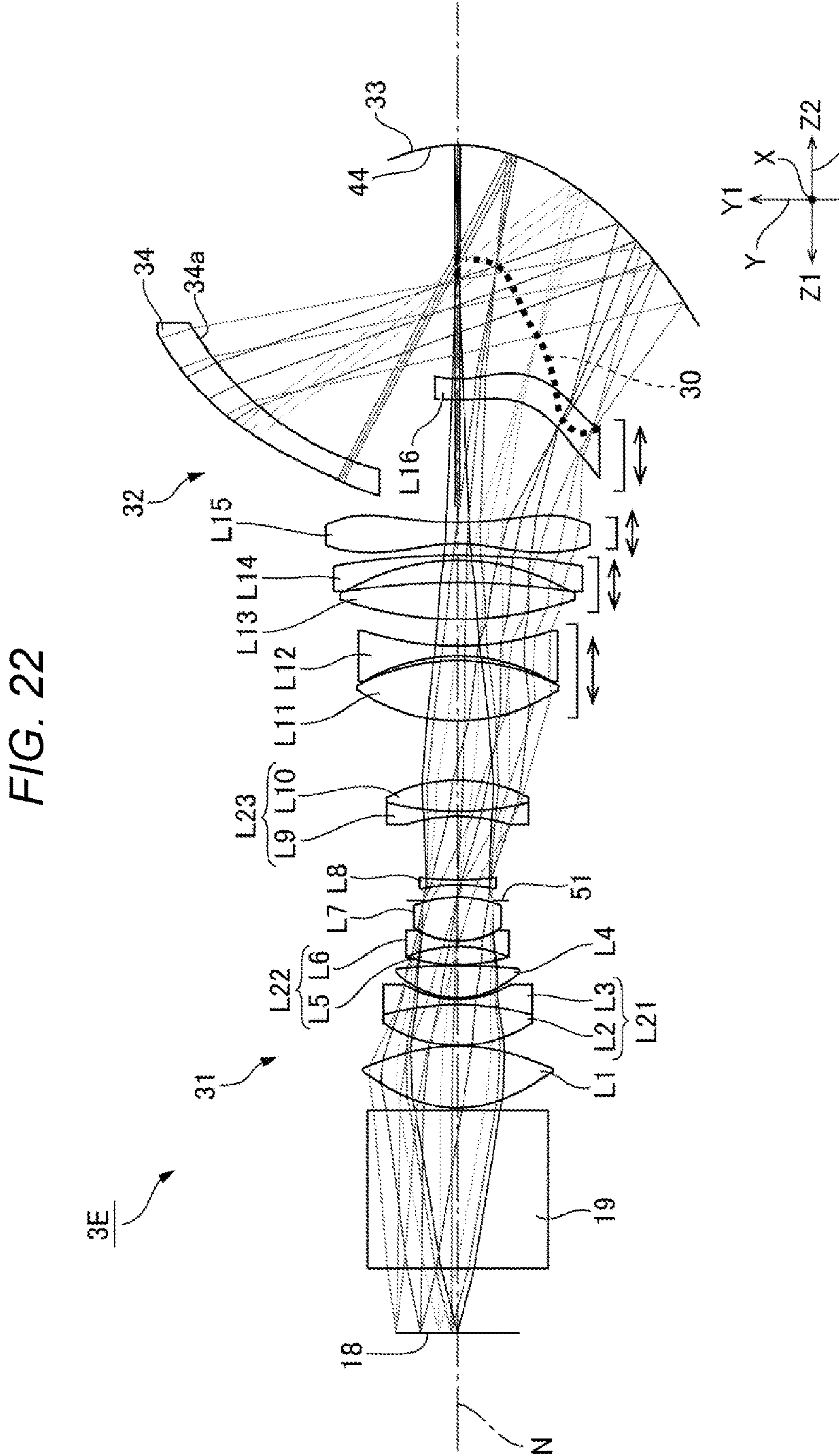
FIG. 22 is a beam diagram showing beams passing through the projection system according to Example 5.

FIG. 22 is a beam diagram showing beams passing through a projection system 3E according to Example 5. The projection system 3E according to the present example is formed of a first optical system 31 and a second optical system 32 sequentially arranged from the reduction side toward the enlargement side, as shown in FIG. 22. The second optical system 32 is disposed on an optical axis N of the first optical system 31.

The first optical system 31 is a refractive optical system. The first optical system 31 is formed of sixteen lenses L1 to L16. The lenses L1 to L16 are arranged in the presented order from the reduction side toward the enlargement side. A diaphragm 51 is disposed between the lens L7 and the lens L8.

The lens L1 has aspherical shapes at opposite sides. The lens L8 has aspherical shapes at opposite sides. The lens L15 has aspherical shapes at opposite sides. The lens L16 has aspherical shapes at opposite sides. The lens L2 and the lens L3 are bonded to each other into a cemented doublet L21. The lens L5 and the lens L6 are bonded to each other into a cemented doublet L22. The lens L9 and the lens L10 are bonded to each other into a cemented doublet L23.

The second optical system 32 includes an optical element 33 and a first lens 34. The optical element 33 and the first lens 34 are arranged in the presented order from the reduction side toward the enlargement side. The optical element 33 has a reflection surface 44, which faces the reduction side. The reflection surface 44 has a concave shape recessed in the second direction Z2. The reflection surface 44 has an aspherical shape. The reflection surface 44 is located at the lower side Y2 of the optical axis N, as shown in FIG. 22. The reflection surface 44 is formed by providing the outer surface, in the first direction Z1, of the optical element 33 with a reflection coating layer. The reflection surface 44 reflects light at the surface, facing in the direction Z1, of the optical element 33.

The first lens 34 is disposed between the lens L16 and the optical element 33 and at the upper side Y1 of the optical axis N. The first lens 34 has negative power. The first lens 34 has a convex enlargement-side surface and a concave reduction-side surface. The first lens 34 has aspherical shapes at opposite sides.

The first region V1 and the second region V2 overlap with each other in the second optical system 32 of the projection system 3A according to Example 1, but the regions do not overlap with each other in the second optical system 32 of the projection system 3E according to the present example.

The liquid crystal panel 18 of the image formation unit 2 is disposed in the reduction-side conjugate plane of the projection system 3E. The screen S is disposed in the enlargement-side conjugate plane of the projection system 3E.

The liquid crystal panel 18 forms a projection image in an image formation plane perpendicular to the optical axis N of the first optical system 31. The liquid crystal panel 18 is disposed in a position offset from the optical axis N of the first optical system 31 toward the upper side Y1. The projection image is therefore formed in a position offset from the optical axis N toward the upper side Y1.

The beams from the liquid crystal panel 18 pass through the first optical system 31 and the second optical system 32 in the presented order. Between the first optical system 31 and the second optical system 32, the beams pass through the lower side Y2 of the optical axis N. The beams are therefore directed through the second optical system 32 toward the reflection surface 44. The beams having reached the reflection surface 44 are deflected back in the first direction Z1 towards the upper side Y1. The beams deflected back by the reflection surface 44 cross the optical axis N toward the upper side Y1 and travel toward the first lens 34. The beams passing through the first lens 34 are widened by the first lens 34 and reach the screen S.

An intermediate image 30 is formed between the lens L16 and the reflection surface 44.

In the projection system 3E, the portion at the reduction side of the first optical system 31 is a telecentric portion.

The projection system 3E has a changeable projection distance. When the projection distance is changed, the lenses L11, L12, L13, L14, L15, and L16 of the first optical system 31 are moved along the optical axis N for focusing. In the focusing, the lenses L11 and L12 are moved as a unit along the optical axis N. In the focusing, the lenses L13 and L14 also are moved as a unit along the optical axis N.

Data on the projection system 3E are listed below,

LL 57.7 mm

MR 44.2 mm imy 11.8 mm scy 1916 mm
M 162
PD 330 mm
TR 0.172
NA 0.250
OL −23% where LL represents the largest radius of the first lens 34, MR represents the largest radius of the reflection surface 44, imy represents a first distance from the optical axis N to the largest image height at the liquid crystal panel 18, scy represents a second distance from the optical axis N to the largest image height of the enlarged image projected on the screen S, M represents a projection magnification that is the quotient of division of the second distance by the first distance, PD represents a projection distance that is the distance from the first lens 34 to the screen S, TR represents a throw ratio that is the quotient of division of the projection distance by the second distance, NA represents the numerical aperture of the liquid crystal panel 18, and OL represents an overlap ratio that is the quotient of division of the first region by the second region.

Data on the lenses of the projection system 3E are listed below. The surfaces of the lenses are numbered sequentially from the reduction side toward the enlargement side. Reference characters are given to the liquid crystal panel, the dichroic prism, the lenses, the optical element, the first lens, and the screen. Data labeled with a surface number that does not correspond to any of the liquid crystal panel, the dichroic prism, the lenses, the optical element, the first lens, and the screen is dummy data. Reference character R represents the radius of curvature. Reference character D represents the axial inter-surface spacing. Reference character C represents the aperture radius, and twice the aperture radius is the diameter of the lens surface. Reference characters R, D, and C are each expressed in millimeters.

| Reference character | Surface number | Shape | R | D | Glass material | Refraction/ Reflection | C |
|---|---|---|---|---|---|---|---|
| 18 | 0 | Spherical | Infinity | 12.2000 | | Refraction | 0.0000 |
| 19 | 1 | Spherical | Infinity | 29.8000 | SBSL7_OHARA | Refraction | 13.4567 |
| | 2 | Spherical | Infinity | 0.5000 | | Refraction | 16.1086 |
| L1 | 3 | Aspherical | 22.9735 | 11.7215 | SFPL51_OHARA | Refraction | 17.0000 |
| | 4 | Aspherical | −33.2895 | 0.1000 | | Refraction | 16.7235 |
| L2 | 5 | Spherical | 26.2193 | 7.7263 | SFPL51_OHARA | Refraction | 13.2273 |
| L3 | 6 | Spherical | −50.8538 | 1.0000 | SLAH58_OHARA | Refraction | 11.8203 |
| | 7 | Spherical | 20.2462 | 0.3000 | | Refraction | 10.1886 |
| L4 | 8 | Spherical | 16.9814 | 6.0240 | SFSL5_OHARA | Refraction | 10.7000 |
| | 9 | Spherical | −124.4574 | 0.2000 | | Refraction | 9.5974 |
| L5 | 10 | Spherical | 32.7350 | 3.3679 | EFD1_HOYA | Refraction | 8.9378 |
| L6 | 11 | Spherical | −25.9116 | 1.0000 | TAFD37_HOYA | Refraction | 8.7379 |
| | 12 | Spherical | 15.3594 | 0.1000 | | Refraction | 7.6026 |
| L7 | 13 | Spherical | 15.2275 | 8.2099 | 528662.6632 | Refraction | 7.6050 |
| 51 | 14 | Spherical | −23.6790 | 2.2870 | | Refraction | 6.6642 |
| L8 | 15 | Aspherical | −46.6839 | 1.0327 | SLAH55VS_OHARA | Refraction | 6.5025 |
| | 16 | Aspherical | 54.0682 | 2.3755 | | Refraction | 6.6286 |
| | 17 | Spherical | Infinity | 5.2141 | | Refraction | 7.1452 |
| | 18 | Spherical | Infinity | 4.3323 | | Refraction | 9.0035 |
| L9 | 19 | Spherical | −33.3190 | 1.0000 | 487000.7040 | Refraction | 10.0000 |
| L10 | 20 | Spherical | 55.6504 | 5.9211 | 731376.3194 | Refraction | 11.8754 |
| | 21 | Spherical | −29.2968 | Variable spacing 1 | | Refraction | 12.5356 |
| L11 | 22 | Spherical | 35.3086 | 11.2891 | 718036.3817 | Refraction | 18.0174 |
| | 23 | Spherical | −42.2683 | 0.8662 | | Refraction | 17.7737 |
| L12 | 24 | Spherical | −36.6046 | 2.0000 | TAFD55W_HOYA | Refraction | 17.5508 |
| | 25 | Spherical | 60.6219 | Variable spacing 2 | | Refraction | 17.8424 |
| L13 | 26 | Spherical | 70.1228 | 6.9671 | 738209.2664 | Refraction | 20.9477 |
| | 27 | Spherical | −134.4173 | 4.1428 | | Refraction | 21.1195 |
| L14 | 28 | Spherical | −42.6546 | 1.0000 | EFDS1W_HOYA | Refraction | 21.1249 |
| | 29 | Spherical | −137.6019 | Variable spacing 3 | | Refraction | 22.4442 |
| L15 | 30 | Aspherical | −29.6454 | 4.0000 | E48R_ZEON | Refraction | 23.1933 |
| | 31 | Aspherical | 66.4079 | Variable spacing 4 | | Refraction | 23.9248 |
| L16 | 32 | Aspherical | 38.1592 | 4.0000 | E48R_ZEON | Refraction | 24.0292 |
| | 33 | Aspherical | 18.1420 | Variable spacing 5 | | Refraction | 26.7248 |
| 44 | 34 | Aspherical | −30.2098 | −63.2541 | | Reflection | 44.2335 |
| 34 | 35 | Aspherical | 60.8785 | −5.0000 | E48R_ZEON | Refraction | 51.5338 |
| | 36 | Aspherical | 61.2471 | 0.0000 | | Refraction | 57.7466 |
| | 37 | Spherical | Infinity | Variable spacing 6 | | Refraction | 224.1805 |
| S | 38 | Spherical | Infinity | 0.0000 | | Refraction | 2878.6944 |

The projection system 3E according to the present example has a changeable projection distance selected from a standard distance, a short distance shorter than the standard distance, and a long distance longer than the standard distance. When the projection distance is changed, the lenses L11, L12, L13, L14, L15, and L16 are moved in the direction of the optical axis N for focusing.

The table below shows the variable spacings 1, 2, 3, 4, 5, and 6 at the projection distances where the focusing is performed. The variable spacing 1 is the axial inter-surface spacing between the lens L10 and the lens L11. The variable spacing 2 is the axial inter-surface spacing between the lens L12 and the lens L13. The variable spacing 3 is the axial inter-surface spacing between the lens L14 and the lens L15. The variable spacing 4 is the axial inter-surface spacing between the lens L15 and the lens L16. The variable spacing 5 is the axial inter-surface spacing between the lens L16 and the reflection surface 44. The variable spacing 6 is the projection distance.

| | | Standard distance | Short distance | Long distance |
|---|---|---|---|---|
| Variable spacing | 1 | 11.1930 | 10.9632 | 11.4774 |
| Variable spacing | 2 | 5.0100 | 3.9219 | 6.6042 |
| Variable spacing | 3 | 2.2028 | 3.0054 | 1.0238 |
| Variable spacing | 4 | 23.0903 | 23.6418 | 22.3820 |
| Variable spacing | 5 | 44.1638 | 44.1529 | 44.1978 |
| Variable spacing | 6 | −330.0000 | −251.0000 | −522.0000 |

The aspherical coefficients are listed below.

| Surface number | S3 | S4 | S15 | S16 |
|---|---|---|---|---|
| Radius of curvature (R) | 22.9735 | −33.2895 | −46.6839 | 54.0682 |
| Conic constant (K) | −0.63480782 | −2.48946482 | 0 | 0 |
| Fourth-order | −7.32862E−06 | 3.44263E−06 | −3.89105E−05 | −1.77200E−05 |
| Sixth-order | 3.87175E−09 | −2.84167E−09 | −5.21407E−07 | −4.86950E−07 |
| Eighth-order | −8.25724E−12 | −7.48747E−14 | 1.29913E−09 | 3.02490E−09 |

| Surface number | S30 | S31 | S32 | S33 |
|---|---|---|---|---|
| Radius of curvature (R) | −29.6454 | 66.4079 | 38.1592 | 18.1420 |
| Conic constant (K) | −9.78559876 | −2.871274538 | −60 | −10.9483185 |
| Fourth-order | 3.43097E−05 | −1.60433E−06 | −9.59108E−05 | −9.87546E−05 |
| Sixth-order | −8.03187E−08 | −4.23005E−08 | 2.43009E−07 | 2.72413E−07 |
| Eighth-order | 1.40155E−10 | 8.63706E−11 | −5.91725E−10 | −5.93614E−10 |
| Tenth-order | −1.52336E−13 | −1.26750E−13 | 8.33380E−13 | 6.92345E−13 |
| Twelfth-order | 7.86163E−17 | 8.50866E−17 | −4.33376E−16 | −2.93433E−16 |

| Surface number | S34 | S35 | S36 |
|---|---|---|---|
| Radius of curvature (R) | −30.2098 | 60.8785 | 61.2471 |
| Conic constant (K) | −0.64479181 | 0.161497477 | −1.23384873 |
| Fourth-order | 6.61313E−06 | 2.69495E−07 | 7.00456E−06 |
| Sixth-order | −1.06166E−08 | −1.66173E−10 | −1.28849E−08 |
| Eighth-order | 1.45898E−11 | 5.99180E−15 | 1.07206E−11 |
| Tenth-order | −1.16075E−14 | −1.37056E−18 | −4.93645E−15 |
| Twelfth-order | 5.50232E−18 | −6.32794E−21 | 1.32277E−18 |
| Fourteenth-order | −1.43605E−21 | 8.94218E−24 | −1.93000E−22 |
| Sixteenth-order | 1.62643E−25 | −2.52469E−27 | 1.19489E−26 |

The projection system 3E according to the present example satisfies Conditional Expressions (1) and (2) below, $$3.5 \leq *(LL+Mr)/imy \times TR \times (1/NA) \leq 6.0 \quad (1)$$

$$TR \leq 0.2 \quad (2)$$

where LL represents the largest radius of the first lens 34, MR represents the largest radius of the reflection surface 44, imy represents the first distance from the optical axis N to the largest image height at the liquid crystal panel 18, TR represents the throw ratio that is the quotient of division of the projection distance by the second distance from the optical axis N to the largest image height of the enlarged image at the screen S, and NA represents the numerical aperture of the liquid crystal panel 18.

In the present example, the values described above are listed below.

LL 57.7 mm

MR 44.2 mm imy 11.8 mm

TR 0.172

NA 0.250

(LL+MR)/imy×TR×(1/NA)=5.95 is therefore satisfied, whereby Conditional Expression (1) is satisfied. Since TR=0.172, Conditional Expression (2) is satisfied.

Effects and Advantages

In the projection system 3E according to the present example, the first optical system 31 includes the two lenses L15 and L16 (aspherical lenses), which are located at the enlargement side of the diaphragm 51 and each have an aspherical shape. The projection system 3E can therefore correct distortion and image curvature on an image height basis.

The lenses L15 and L16 are each moved in the direction of the optical axis N during focusing. Since the lenses L15 and L16, which correct a variety of aberrations on an image height basis, are moved in the direction of the optical axis N, occurrence of the variety of aberrations during focusing can be suppressed.

The first optical system 31 further includes the cemented doublet L23 at the enlargement side of the diaphragm 51. The chromatic aberrations can therefore be corrected well.

In the projection system 3E according to the present example, the reflection surface 44 is provided with a reflection layer. The accuracy of the shape of the reflection surface 44 in the present example is therefore readily improved as compared with that of the reflection surface 42 in Example 1. Furthermore, in the projection system 3E according to the present example, the support film layer is provided on the side opposite from the reflection coating layer, whereby the optical performance of the reflection surface 44 is not likely to deteriorate. Stable optical performance of the reflection surface 44 is therefore likely to be achieved during the manufacture of the optical element 33.

Figure 23:
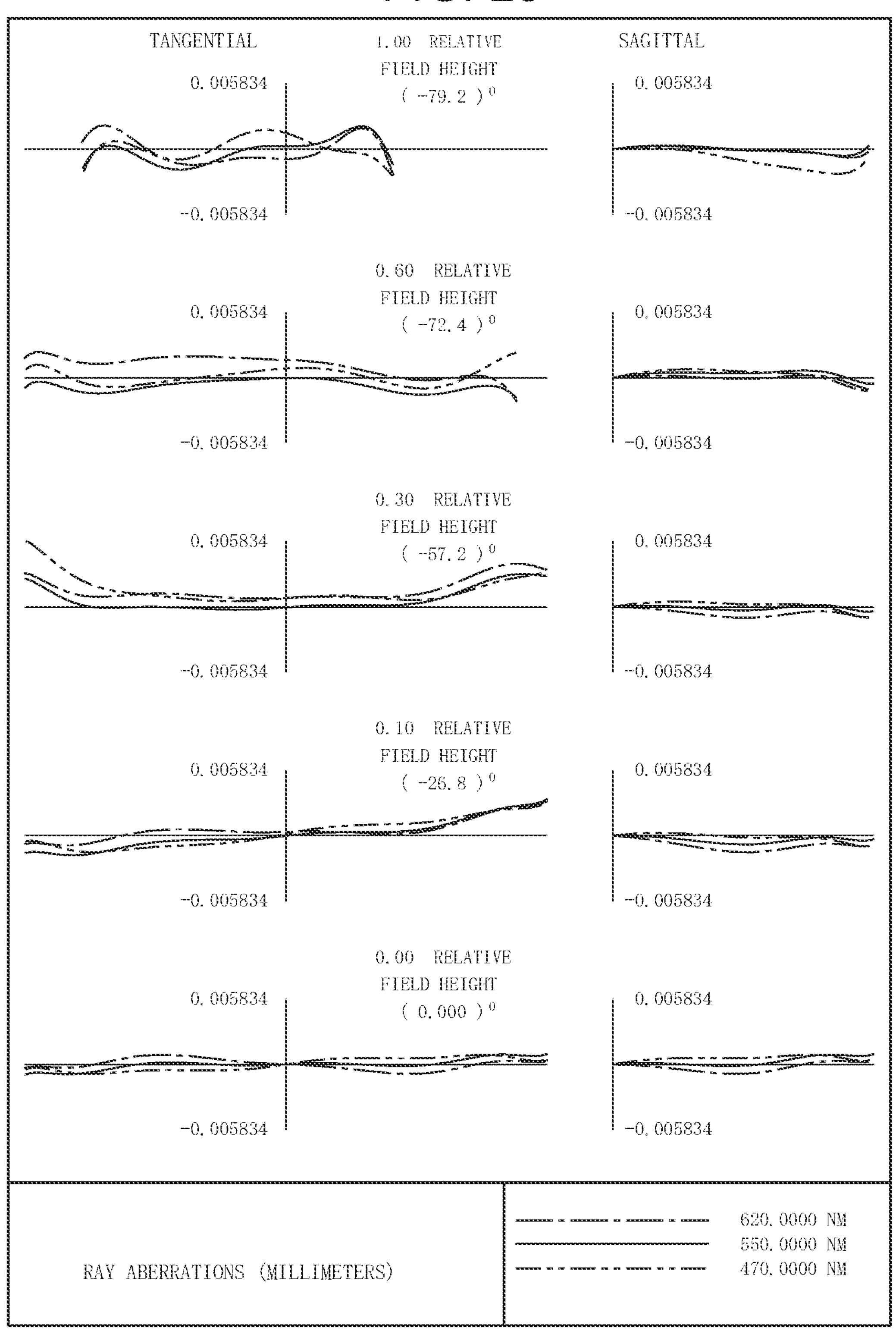
FIG. 23 shows the lateral aberrations produced by the projection system according to Example 5 set at the standard distance.
Figure 24:
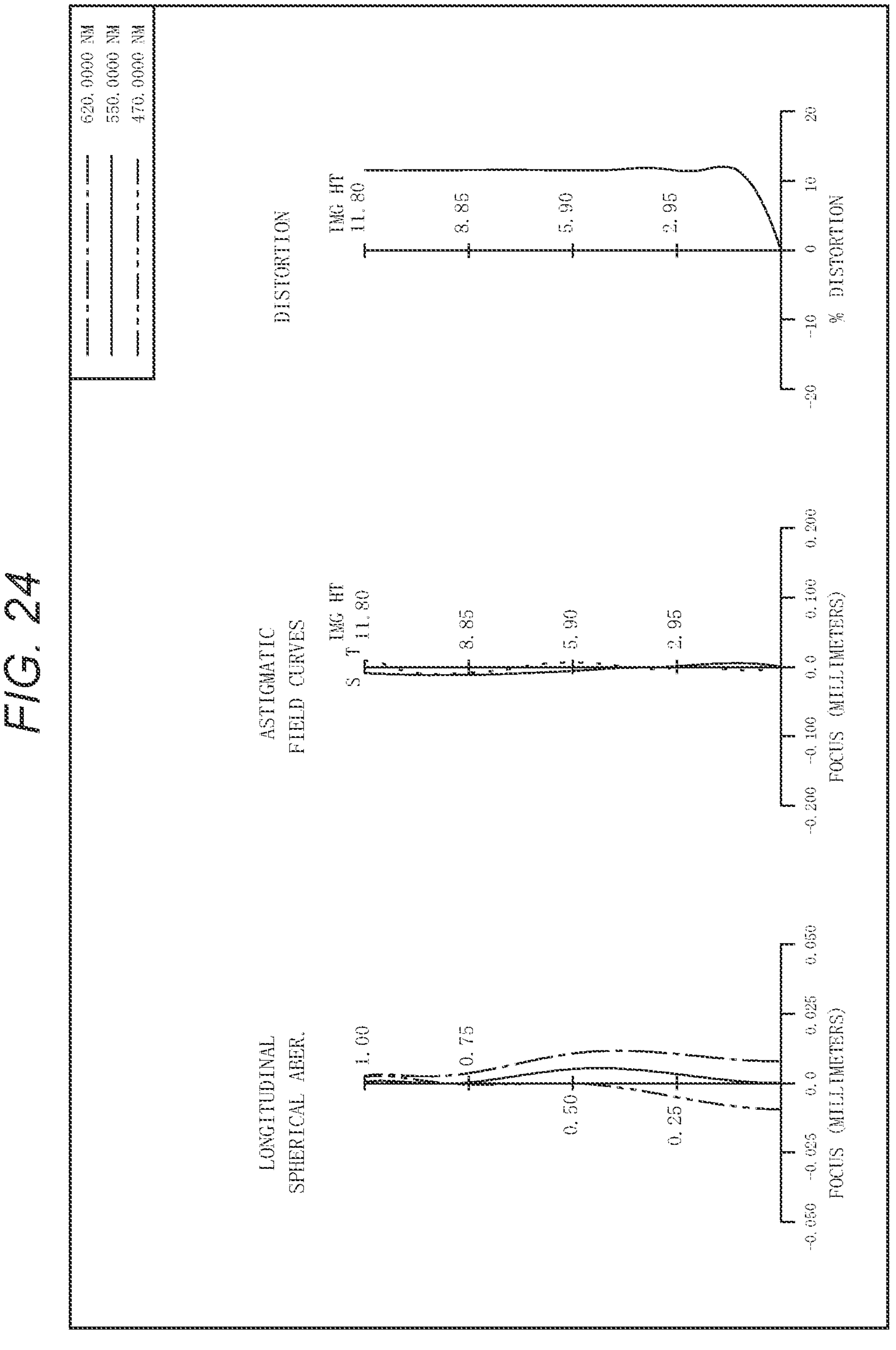
FIG. 24 shows the spherical aberration, astigmatism, and distortion produced by the projection system according to Example 5 set at the standard distance.
Figure 25:
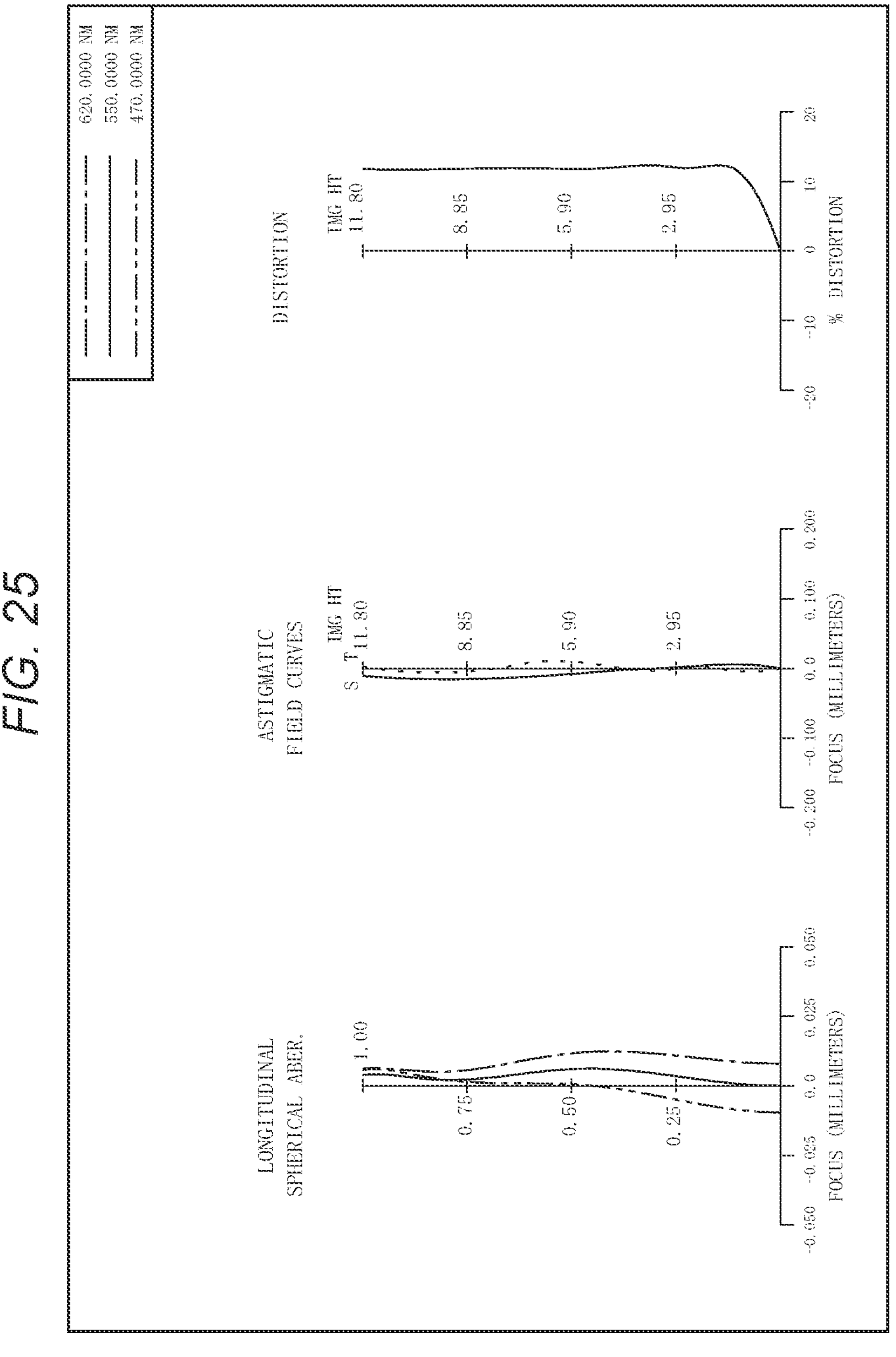
FIG. 25 shows the spherical aberration, astigmatism, and distortion produced by the projection system according to Example 5 set at the short distance.
Figure 26:
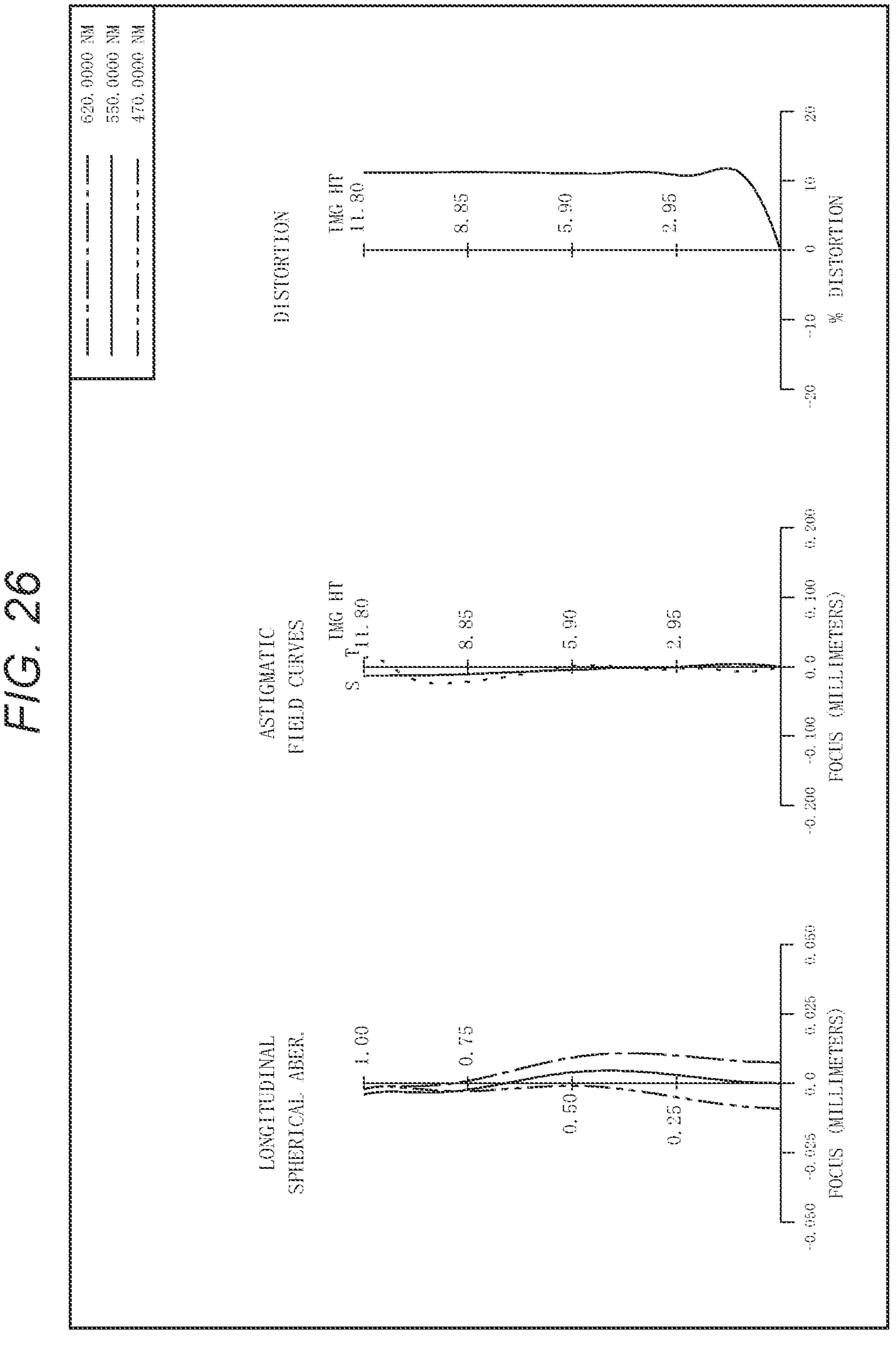
FIG. 26 shows the spherical aberration, astigmatism, and distortion produced by the projection system according to Example 5 set at the long distance.

The projection system 3E according to the present example, which satisfies Conditional Expressions (1) and (2), can provide the same effects and advantages as those provided by the projection system 3A according to Example 1. FIG. 23 shows the lateral aberrations produced by the projection system 3E set at the standard distance. FIG. 24 shows the spherical aberration, astigmatism, and distortion produced by the projection system 3E set at the standard distance. FIG. 25 shows the spherical aberration, astigmatism, and distortion produced by the projection system 3E set at the short distance. FIG. 26 shows the spherical aberration, astigmatism, and distortion produced by the projection system 3E set at the long distance. The projection system 3E according to the present example produces an enlarged image having suppressed aberrations, as shown in FIGS. 23 to 26.

What is claimed is:

1. A projection system for enlarging a projection image formed by an image formation device disposed in a reduction-side conjugate plane and projecting the enlarged image in an enlargement-side conjugate plane, the projection system comprising:

a first optical system and a second optical system sequentially arranged from the reduction side toward the enlargement side, wherein the first optical system includes a diaphragm, the second optical system includes an optical element having a concave reflection surface and a first lens having negative power, the optical element and the first lens sequentially arranged from the reduction side toward the enlargement side, an intermediate image conjugate with the reduction-side conjugate plane and the enlargement-side conjugate plane is formed between the first optical system and the second optical system, a portion at the reduction side of the first optical system forms a telecentric portion, and the projection system satisfies Conditional Expressions (1) and (2) below, $$3.5 \leq *(LL+Mr)/imy \times TR \times (1/NA) \leq 6.0 \tag{1}$$

$$TR \leq 0.2 \tag{2}$$

where LL represents a largest radius of the first lens, MR represents a largest radius of the reflection surface, imy represents a first distance from an optical axis to a largest image height at the image formation device, TR represents a throw ratio that is a quotient of division of a projection distance by a second distance from the optical axis to a largest image height of the enlarged image, and NA represents a numerical aperture of the image formation device.

2. The projection system according to claim 1, wherein the first optical system includes two or more aspherical lenses on the enlargement side of the diaphragm.

3. The projection system according to claim 2, wherein the aspherical lenses are moved in a direction of the optical axis during focusing.

4. The projection system according to claim 1, wherein the first optical system includes a cemented doublet on the enlargement side of the diaphragm.

5. The projection system according to claim 1, wherein a surface of the reflection surface is provided with a reflection layer.

6. The projection system according to claim 1, wherein a first region and a second region overlap with each other, the first region being a region as a result of projection of a luminous flux passage region of a reduction-side lens surface of the first lens onto the optical axis, the second region being a region as a result of projection of a luminous flux passage region of the reflection surface onto the optical axis.

7. The projection system according to claim 6, wherein the first region overlaps with the second region by an amount greater than or equal to 10%.

8. The projection system according to claim 1, wherein the projection system satisfies Conditional Expression (3) below, $$0.3 \leq NR \tag{3}$$

where NA represents the numerical aperture of the image formation device.

9. A projector comprising:

the projection system according to claim 1; and the image formation device that forms a projection image in the reduction-side conjugate plane of the projection system.

* * * * *